(12) United States Patent
Moebius et al.

(10) Patent No.: US 11,641,531 B2
(45) Date of Patent: May 2, 2023

(54) MULTI-MODE INTERFERENCE COUPLER-BASED FLAT COMPRESSIVE AND TRANSFORM IMAGER

(71) Applicant: The Charles Stark Draper Laboratory Inc., Cambridge, MA (US)

(72) Inventors: Michael Moebius, Allston, MA (US); Julian Brown, Cambridge, MA (US); Steven Spector, Lexington, MA (US); Benjamin Lane, Sherborn, MA (US); Alan Zhou, Brookline, MA (US); Hannah Anne Clevenson, Cambridge, MA (US); Lucas David Benney, Brighton, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 17/113,956

(22) Filed: Dec. 7, 2020

(65) Prior Publication Data
US 2021/0120197 A1    Apr. 22, 2021

Related U.S. Application Data

(62) Division of application No. 16/173,854, filed on Oct. 29, 2018, now Pat. No. 11,218,655.

(60) Provisional application No. 62/578,120, filed on Oct. 27, 2017.

(51) Int. Cl.
| | | |
|---|---|---|
| G02B 6/293 | (2006.01) | |
| H04N 5/369 | (2011.01) | |
| G02B 27/00 | (2006.01) | |
| G02B 3/00 | (2006.01) | |
| G02B 6/42 | (2006.01) | |
| G02B 6/28 | (2006.01) | |
| G02B 5/18 | (2006.01) | |

(52) U.S. Cl.
CPC .......... *H04N 5/369* (2013.01); *G02B 3/0056* (2013.01); *G02B 6/29344* (2013.01); *G02B 6/4215* (2013.01); *G02B 27/0087* (2013.01); *G02B 3/0043* (2013.01); *G02B 6/2813* (2013.01); *G02B 2005/1804* (2013.01)

(58) Field of Classification Search
None
See application file for complete search history.

(56) References Cited

U.S. PATENT DOCUMENTS

| | | |
|---|---|---|
| 6,819,789 B1 | 11/2004 | Kantor et al. |
| 6,956,653 B1 | 10/2005 | Lam |
| 2003/0223672 A1 | 12/2003 | Joyner et al. |

(Continued)

FOREIGN PATENT DOCUMENTS

WO    WO-2010023283 A1 *    3/2010    ............. G02B 6/125

OTHER PUBLICATIONS

International Search Report and Written Opinion dated Mar. 8, 2019 in PCT Application No. PCT/IB2018/058459.

*Primary Examiner* — Chad H Smith
(74) *Attorney, Agent, or Firm* — Potomac Law Group, PLLC; Reza Mollaaghababa; John J. Penny, Jr.

(57) ABSTRACT

A compressive/transform imager comprising a lens array positioned above input ports for collecting light into the input ports, waveguides routing the light from the input port to waveguide mixing regions (e.g. multi-mode interference couplers), and detectors for receiving outputs of the waveguide mixing regions.

9 Claims, 21 Drawing Sheets

(56) References Cited

U.S. PATENT DOCUMENTS

2009/0160576 A1    6/2009  Dent
2013/0321816 A1   12/2013  Dattner et al.
2015/0180133 A1    6/2015  Hunt et al.
2016/0245895 A1*   8/2016  Lane ................. G02B 6/12009

* cited by examiner

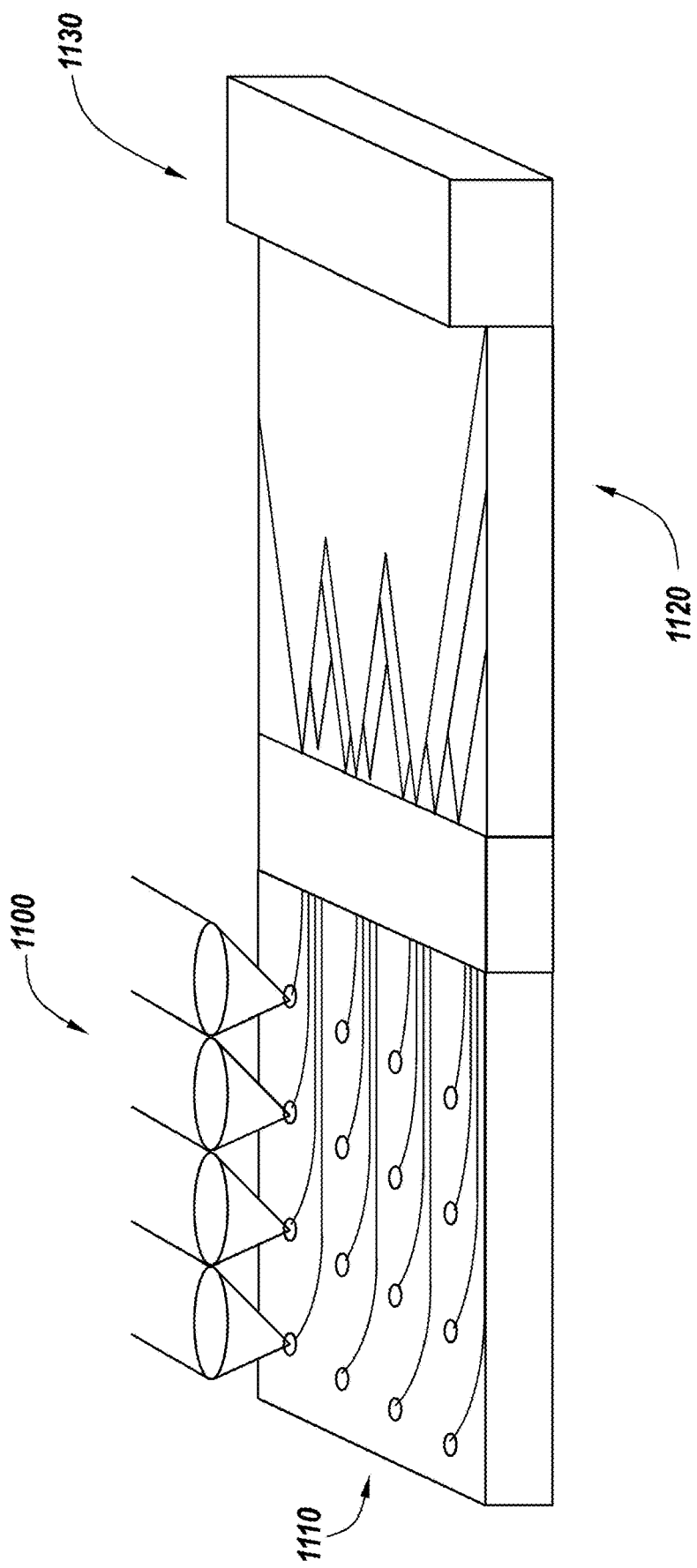

MULTI-MODE INTERFERENCE COUPLER-BASED FLAT COMPRESSIVE AND TRANSFORM IMAGER

RELATED APPLICATIONS

This application is a divisional application of U.S. patent application Ser. No. 16/173,854, filed Oct. 29, 2019, entitled, "MULTI-MODE INTERFERENCE COUPLER-BASED FLAT COMPRESSIVE AND TRANSFORM IMAGER", which claims priority from and the benefit of U.S. Provisional Patent Application No. 62/578,120 filed on Oct. 27, 2017, the entire contents of which are incorporated herein by reference.

STATEMENT OF GOVERNMENT INTEREST

This invention was made with government support awarded by the Defense Advanced Research Projects Agency. The government has certain rights in the invention.

TECHNICAL FIELD

The present disclosure relates generally to compressive imagers; and more particularly to multi-mode interference coupler-based flat, compressive and transform imagers.

BACKGROUND

Imaging systems for many applications are required to have minimal size and weight, for example for star trackers, smartphone cameras, etc. However, this presents challenges since imaging systems are generally bulky because they require a sensor and lens placed approximately at a focal length away to form an image. Increasing the light collection of the imaging system requires increasing the diameter of the lens, which requires a proportional increase in the focal length. This makes it difficult to reduce the size of imaging systems.

For applications that require a minimal size imaging system, it is desirable to have a flat/chip-scale imager having a thickness of approximately 1 mm. A possible configuration for a flat imager can be made by fabricating a Butler matrix or H-tree using multiple waveguides. An H-tree arrangement can maintain nearly equal path lengths for all paths between couplers and detectors. Such approaches have been used extensively for radio frequency (RF) beam forming and imaging. However, these configurations generally have complicated waveguide routing, which often requires multiple layers of fabrication and vertical interconnects or couplers. Multilayer fabrication and vertical interconnects are more difficult to implement in optical systems than RF systems due to feature size and material limitations. Also, these configurations are very sensitive to phase differences that are introduced by fabrication tolerances due to the comparatively shorter optical wavelengths. Some types of flat imagers can require a large number of waveguides. This can require multiple chips arranged in three dimensions for waveguide routing. A flat imager having a small number of waveguides, a minimal number of or no vertical interconnects, and minimal sensitivity to variations introduced by fabrication tolerances is easier to build and can potentially occupy a smaller volume.

SUMMARY

At least one embodiment of the present invention is directed to a flat imager design, which can be based on a single layer of waveguide fabrication, which greatly simplifies the design and fabrication process. The imager comprises a compressive/transform sensor and a phased array of optical couplers.

At least one embodiment of the present invention is directed to a flat imager design, which can receive inputs from many directions at the same time. By recovering many scrambled outputs, the imager can localize the direction of arrival of incoming light without the need for a lens or focusing optic placed a focal length in front of the detector. Randomness between the outputs ensures that all outputs contribute unique information to the image and is required to ensure no blind spots in the field of view. Random mixing of inputs makes the embodiments of the present disclosure less sensitive to path length mismatch between different input ports in the device, compared to the path matching requirements of an H-tree. This greatly simplifies fabrication.

In another example embodiment, the present disclosure relates to a transform imager including a chip, a number of input ports formed in the chip for coupling light to a waveguide array; a waveguide mixing region configured to receive light from the waveguide array; and a number of detectors for receiving outputs from the waveguide mixing region. In some embodiments, the transform imager is a compressive transform imager wherein some outputs from the waveguide mixing region are terminated, such that the number of input ports is greater than the number of detectors. In another embodiment, the imager also includes a micro-lens array formed on the chip for collecting light into the first plurality of input ports. In another embodiment, the imager also includes a randomly spaced, sparsely spaced, or non-uniformly spaced input array for collecting light into the first plurality of input ports. In another embodiment, the input ports include a grid of N×M regularly spaced input ports. In another embodiment, the waveguide array is a multi-mode H-tree array configured to maintain substantially equal path lengths between the first plurality of input ports and the second plurality of detectors. In another embodiment, the waveguide array and waveguide mixing region are made of a material selected from the group consisting of a silicon, silicon nitride, sapphire, titanium dioxide, diamond, silicon carbide, chalcogenide glass, and plasmonic structures. In another embodiment, each of the first plurality of input ports is an aperture or a grating coupler. In another embodiment, the waveguide array and a number of initial waveguide mixing regions are formed in a plurality of layers, wherein some outputs of the initial waveguide mixing regions are terminated. In another embodiment, the terminated outputs of the initial waveguide mixing region are randomly or irregularly spaced. In another embodiment, the imager also includes a final waveguide mixing region configured to receive non-terminated outputs from the third plurality of waveguide mixing regions and scramble information from the non-terminated outputs before coupling them to the second plurality of detectors. In another embodiment, the final waveguide mixing region is a compressive imager wherein at least some of the outputs of the final waveguide mixing region are terminated prior to detection by second plurality of detectors. In another embodiment, the waveguide mixing region is a multi-mode Rotman lens configured to focus light received from the first plurality of input ports.

In another non-limiting example, the present disclosure relates to a method of extracting an image from a transform imager. The method includes receiving light from a specific image input at a first plurality of input ports of a transform imager; directing the light to a waveguide mixing region via a waveguide array; mixing the light within the waveguide mixing region; receiving mixed light at a second plurality of detectors from the waveguide mixing region; measuring responses from the second plurality of detectors to a specific image input in order to perform calibration; selecting measured responses corresponding to peaks in the image input; and adjusting the calibration in order to recover different targeted information. In some embodiments, selecting measured responses includes identifying significant components of the measured responses including the top 5% of values. In some embodiments, the transform imager is a compressive transform imager wherein some outputs from the waveguide mixing region are terminated, such that the first plurality of input ports has a number greater than the second plurality of detectors. In some embodiments, the method also includes reconfiguring an output response of a compressive/transform imager by: introducing a phase shift between $-\pi$ to $\pi$ or between 0 to $2\pi$ at input apertures; and recovering additional information to recover a more complex scene using a unique set of output responses from the imager.

In another non-limiting example, the present disclosure relates to a method for calibrating a transform imager. The method includes determining a complex matrix representing a modification of phase or amplitude to a transfer matrix of the transform imager; determining a set of unique outputs from the transform imager; recovering an initial transfer matrix of the transform imager with no modifications of phase or amplitude introduced; combining the initial transfer matrix and the complex matrix representing the modification of phase or amplitude; and recovering additional information from the imager by using N times more unique modifications of phase or amplitude at inputs to account for an N times reduction in total number of output ports.

In another non-limiting example, the present disclosure relates to a method of making a compressive transform imager having n number of input ports suitable for detecting a number of expected features k in a scene. The method includes forming a chip having n input ports formed on the chip for coupling light to a waveguide array; forming a waveguide mixing region configured to receive light from the waveguide array; coupling a plurality of detectors to the waveguide mixing region for receiving outputs from the waveguide mixing region; and terminating some of the outputs from the waveguide mixing region, wherein a number of terminated outputs is proportional to k*log(n/k).

DETAILED DESCRIPTION OF THE EMBODIMENTS

Embodiments of the invention can include an integrated, on-chip compressive/transform imager comprising input ports/apertures connected to waveguides. The waveguides route light to waveguide mixing regions (e.g. multi-mode interference couplers, MMI's). These couplers route light to output ports connected to or routed to detectors. Embodiments of the invention also can include methods of extracting an image from the scrambled signal at the output ports of the device, and methods of correcting for the spectrum of the signal and determining the spectrum of the signal using the compressive/transform imager described herein. Embodiments of the invention also include methods for increasing the amount of information that can be extracted from an imager with a limited number input ports/apertures.

These techniques enable the invention to be developed for general imaging applications (i.e. imaging and recovering complex scenes).

Throughout the specification, the term "wafer-scale imager" means any imaging system built by patterning a waveguide array onto a wafer or integrated photonic chip. The term "phased array" means an arrangement of apertures/collectors connected so as to act as a single, larger, aperture or collector. The term "transform imager" means an imaging system that transforms the input into an output using a well-defined mathematical transform, e.g. Fourier, FFT, DCT, Hadamard transform, or random. The term "compressive imager" means an imaging system that discards some of the incoming light, or doesn't fully sample all of the incoming information. One skilled in the art will realize that a compressive imager performs a mathematical transform, while also being "compressive" in that some of the incoming light or information is discarded. However, because the light has been mixed before dropping off one or more modes or terminating some of the outputs, some information from each of the inputs is still preserved.

Figure 1:
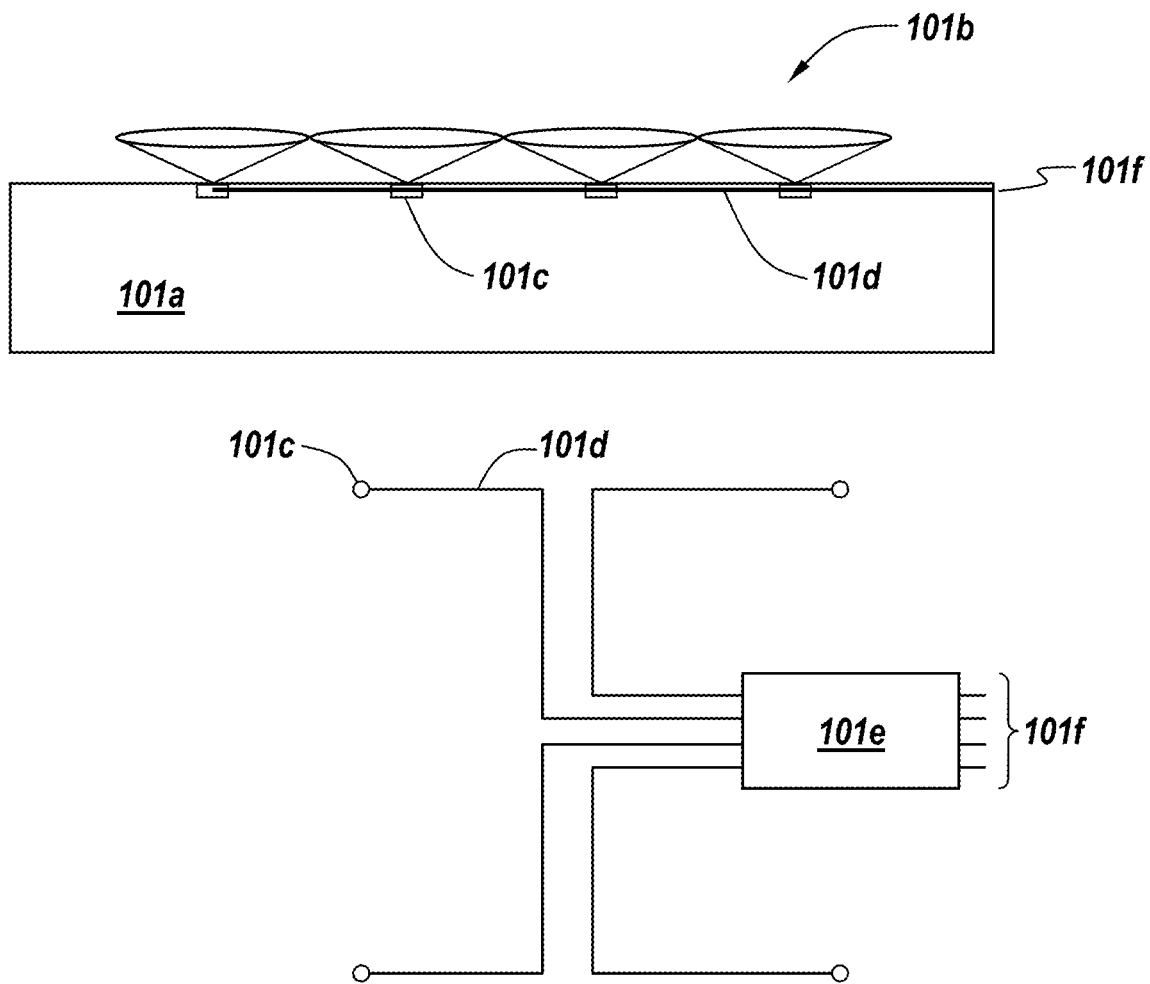
FIG. 1 shows an overview of the components of at least one embodiment of a compressive/transform imager of the present disclosure.

FIG. 1 shows an overview of the components of at least one embodiment of a compressive/transform imager of the present disclosure. As shown in FIG. 1, this embodiment includes a micro-lens array 101b, which is positioned above input ports 110c, which can consist of apertures or grating couplers. The micro-lens array 101b can be used to increase the light collection of the device. The device can be fabricated directly on a chip 101a. Light is coupled into a waveguide array 101d, and then into a waveguide mixing region 101e (e.g., multi-mode interference couplers, MMI's). Outputs from the MMI's can be fed directly into detectors 101f positioned at the output of the device. Different types of MMI's can be used. For example, narrowband MMI's can be used when the input signal is a narrow-band signal, and broad-band MMI's can be used to improve the throughput of the imager when the input signal is a broadband signal. In some example embodiments, the compressive/transform imager may not require a micro-lens array 101b, and may instead include a random array of couplers formed on the chip 101a. For example, the imager may be implemented with a randomly spaced, sparsely spaced, or non-uniformly spaced input array for collecting light into the imager.

Figure 2:
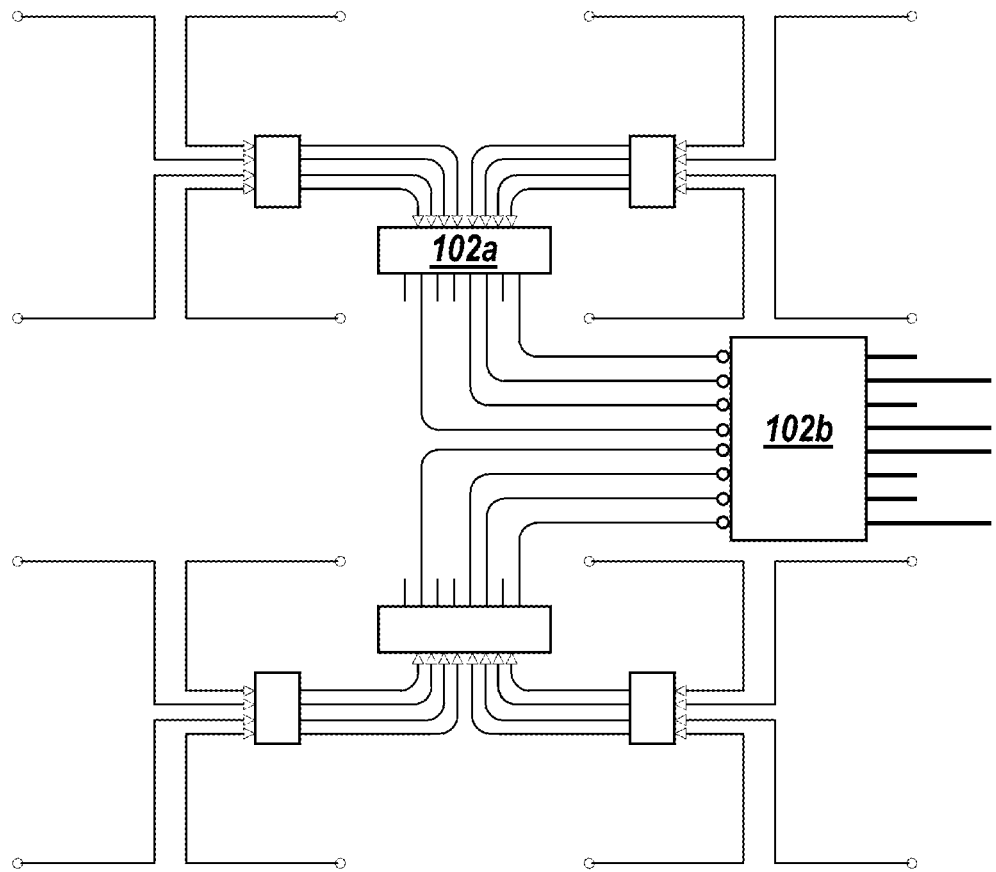
FIG. 2 shows another embodiment of a compressive imager of the present disclosure.

FIG. 2 shows how several layers of MMI's 102a can be used to combine the input from a large number of input ports. A fraction of the output ports of the MMI can be terminated. This reduces the number of total waveguides routed to output ports, which improves the ease of routing waveguides on the chip and reduces the total number of detectors required at the output. Terminating fewer output ports from MMIs increases the total signal collected by the device. Additionally, for complex images, each output port contributes approximately one bit of information. Therefore, a larger number of output ports is required for more complex scenes. In FIG. 2, four (4) out of eight (8) output ports are terminated, but any fraction of output ports can be terminated. The ports that are dropped can be randomly selected in order to minimize the correlation of output intensity between the final output ports of the device. Adding a random phase shift to the individual input ports is another option for decreasing the correlation of the signal between different output ports. A final MMI 102b can be used to scramble the signal from all waveguides on the device before coupling the MMI's to the detectors at the output. This makes it possible to localize the direction of arrival of incoming star light in a faster and more efficient manner.

Some output ports at the final MMI 102b can be dropped. Alternatively, all outputs of the final MMI 102b can be routed to the detectors. The final MMI 102b can be designed with a larger number of input and output ports in order to increase the number of output ports for the device, which increases the total number of independent measurements that can be made by the device. The total number of output ports impacts the accuracy to which a compressive/transform imager can recover the location of a star when utilized as a star tracker and, more generally, the complexity of the scene that can be recovered by the compressive/transform imager. A greater number of output ports enables more accurate star tracking and recovery of more complex scenes.

In a multi-mode H-tree arrangement, at each stage of combination, more than one of the outputs are preserved and carried to the next level. This has the effect of preserving light and information that otherwise would be discarded. The "compressive" part of the imager, at each stage of combination, discards some of the waveguides. This is necessary because otherwise there would be as many outputs required as there are grating couplers, which would be hard to accommodate in the wafer. An important factor is how one chooses to discard some of the waveguides. First, the light is scrambled in the combination stage using a multi-mode interference coupler (MMI), and optionally additional phases/path delay added to individual waveguides. These are random, so as to maximally spread the light from any given input coupler into many different output couplers. That way, even though some of the outputs are discarded, some information is preserved from every input. Full recovery under certain circumstances is possible (known in the literature as "compressive sensing") (Canes, E. J., Romberg, J. K., & Tao, T. (2006). Stable signal recovery from incomplete and inaccurate measurements. Communications on Pure and Applied Mathematics, 59(8), 1207-1223. http://doi.org/10.1002/cpa.20124, Candes, E. J., Romberg, J., & Tao, T. (2006). Robust uncertainty principles: exact signal reconstruction from highly incomplete frequency information. IEEE Transactions on Information Theory, 52(2), 489-509. http://doi.org/10.1109/TIT.2005.862083). The example shown in FIG. 2 can be called a "staged" multi-mode compressive/transform imager because it includes a number of MMIs at various stages in the device.

Figure 3:
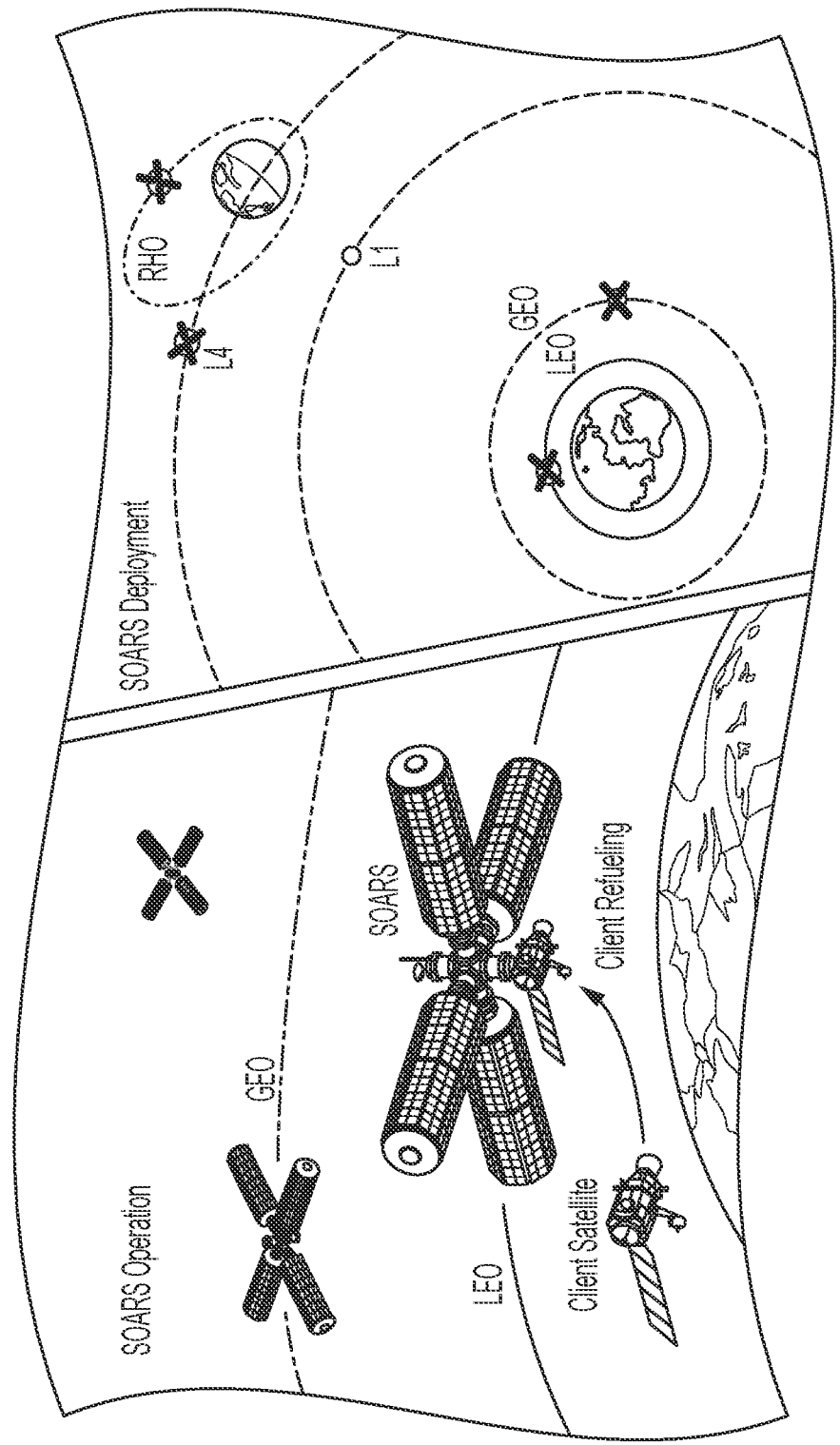
FIG. 3 shows an example of a multi-mode interference coupler, according to an embodiment of the present disclosure.
Figure 4:
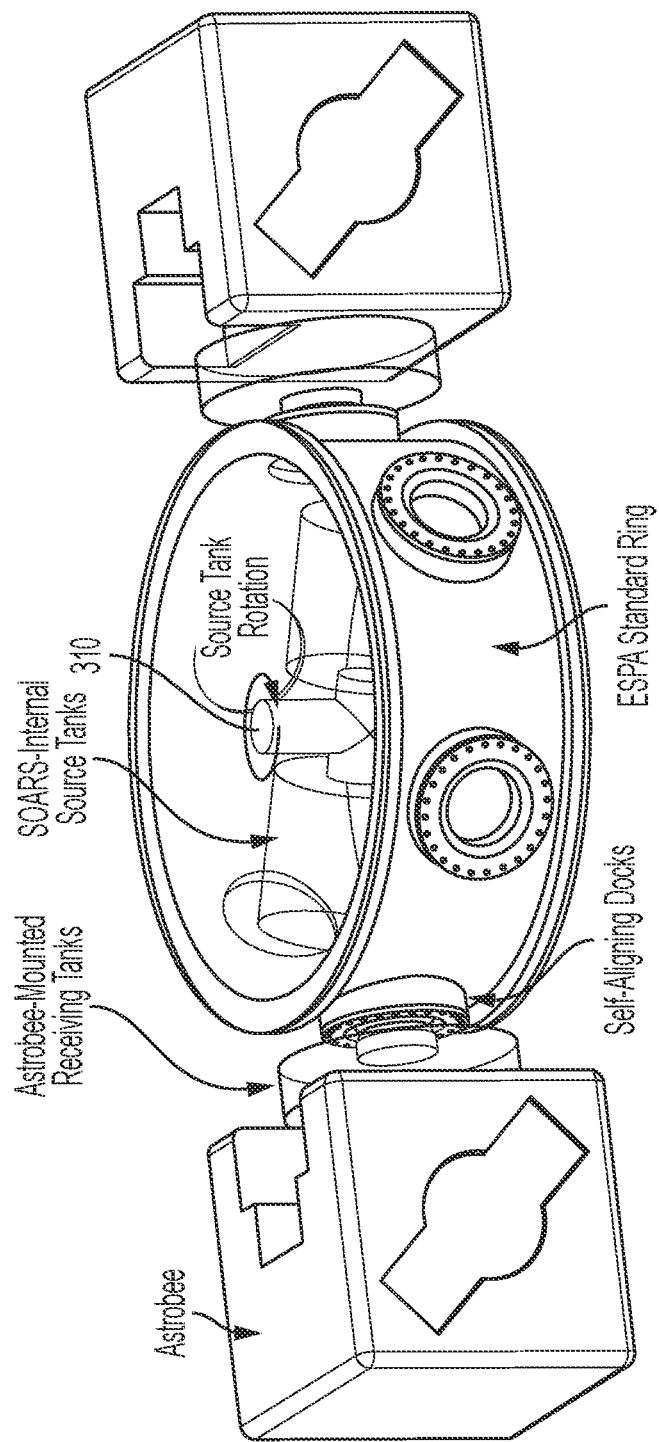
FIG. 4 shows an example of a broadband multi-mode interference coupler, according to an embodiment of the present disclosure.

FIGS. 3 and 4 show some examples of MMI designs that can be used with the compressive/transform imager. FIG. 3 shows a non-broadband MMI. As shown in FIG. 3, the MMI includes a plurality of tapered waveguides at the input and output of the MMI coupler, which can be designed to maximize the transmission of the compressive/transform imager. The MMI of FIG. 3 includes an MMI core material 103a, and an MMI cladding material 103b. The MMI core material 103a can be made of silicon. Other materials can be used, such as silicon nitride, sapphire, titanium dioxide, diamond, silicon carbide, chalcogenide glass, which can be used to extend the wavelengths of into the visible spectrum. In additional embodiments, the collectors, waveguides, mixers, or other components described herein can be implemented with plasmonic structures (i.e. structures implemented by combining metal and dielectric materials). In a non-limiting example, all of these materials have a sufficiently high refractive index to work with silica cladding, which makes packaging devices easier. The MMI cladding material 103b can be made of silica. Other materials can be used, such as cytop (a fluoropolymer), SU-8, other low index polymers, or any material from the list of materials above, so long as the MMI core material chosen has a higher index of refraction than the cladding material. The substrate used for devices can be a silicon chip with thick thermal oxide to ensure light in the waveguide layer does not interact with the substrate. The MMI design is defined by an MMI length 103c, an MMI width 103d, a waveguide width 103e, a waveguide spacing 103f, and a tapered waveguide width 103g. These dimensions determine the transmission characteristics (i.e., wavelength, efficiency). The thickness of the MMI core material 103a is also an important design parameter.

FIG. 4 shows a broadband MMI designed for broadband transmission that can be used with embodiments of the present disclosure. Details on one method of designing broadband MMIs is given in (Maese-Novo, a, Halir, R., Romero-García, S., Pérez-Galacho, D., Zavargo-Peche, L., Ortega-Moñux, A., . . . Cheben, P. (2013). Wavelength independent multimode interference coupler. Optics Express, 21(6), 7033. https://doi.org/10.1364/OE.21.007033). As shown in FIG. 4, the broadband MMI comprises a plurality of tapered waveguides at the input and output of the MMI coupler, which can be designed to maximize the transmission of the compressive/transform imager. The MMI of FIG. 4 also comprises an MMI core material 104a, and an MMI cladding material 104b. The MMI core material 104a can be made of silicon and the MMI cladding material 104b can be made of silica. The other materials listed above with respect to FIG. 3 also can be used as the core material and cladding material to extend the wavelengths of into the visible spectrum. The MMI design is defined by an MMI length 104c, an MMI width 104d, a waveguide width 104e, a waveguide spacing 104f, and a tapered waveguide width 104g. The MMI of FIG. 4 also comprises sub-wavelength grating 104h alternating between the core and cladding material 104a/104b. The sub-wavelength grating 104h forms the tapers and body of the broadband MMI. The dimensions and periodicity of the sub-wavelength grating 104h determine the transmission characteristics (i.e., wavelength, efficiency). The thickness of the MMI core material 104a is also an important design parameter.

Appropriate designs for the MMI's of the compressive/transform imager can be generated by analytical formulas known in the art (e.g., Full references which provide design rules: Bachmann, M., Besse, P. a, & Melchior, H. (1994). General self-imaging properties in N×N multimode interference couplers including phase relations. Applied Optics, 33(18), 3905-3911. https://doi.org/10.1364/AO.33.003905 Soldano, L. B., & Pennings, E. C. M. (1995). Optical multi-mode interference devices based on self-imaging: principles and applications. Journal of Lightwave Technology, 13(4), 615-627. https://doi.org/10.1109/50.372474 Heaton, J. M., & Jenkins, R. M. (1999). General Matrix Theory of Self-Imaging in Multimode Interference (MMI) Couplers. IEEE Photonics Technology Letters, 11(2), 212-214. https://doi.org/10.1109/68.740707). Precise designs require the use of numerical methods, such as eigenmode expansion solvers, finite-difference time-domain methods, and beam propagation methods in order to calculate and optimize the performance. Numerical methods allow rapid testing of many iterations of MMI designs and dimensions to optimize transmission properties in the desired wavelength ranges. The length of the MMI should be chosen to ensure maximum mixing of signals from all input ports with one another at the device output. This can be achieved by choosing the length of the MMI such that it can function as a 1×N splitter (N is the number of input and output ports), where the signal from each of the N inputs is split to N outputs.

Figure 5C:
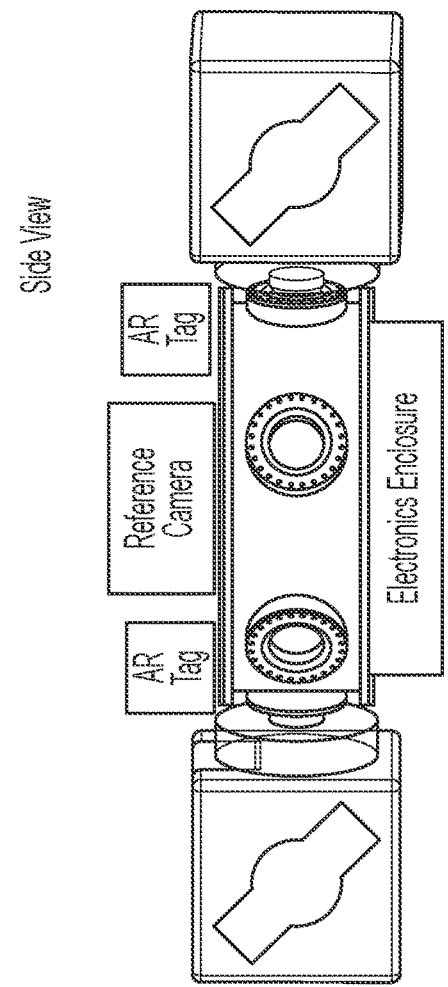
FIGS. 5A-5B show the transmission spectrum of a standard MMI and a broadband MMI, according to an embodiment of the present disclosure.
Figure 5A:
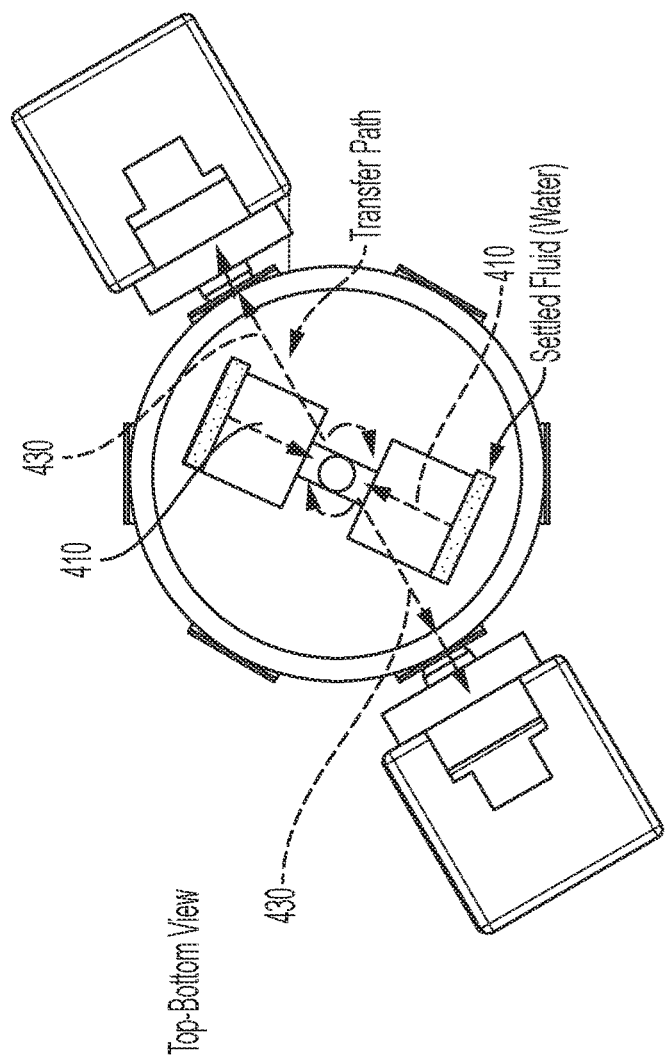
Figure 5B:
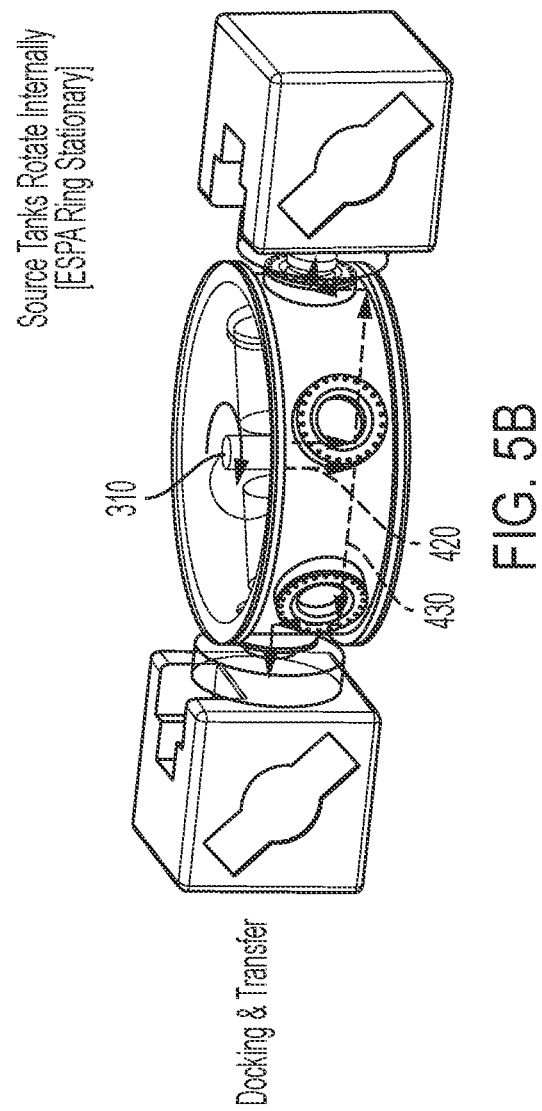

It is desirable to use the broadband MMI shown in FIG. 4 in order to enable a high throughput of a broad range of wavelengths through the compressive/transform imager. For example, a broadband MMI with 4 input ports and 4 output ports can have a transmission bandwidth of 350 nm, over 5 times as wide as a non-broadband MMI with 4 input and 4 output ports, as shown in FIGS. 5A-5B. This can be beneficial for a compressive/transform imager that operates with a broadband input spectrum. Also, improvements to MMI's and grating couplers at the input ports can increase the transmission of light and decrease the size of the device.

A variety of designs can be utilized for the integrated optical components of the compressive/transform imager. For example, the top-down profile and index profile of the MMI's can be modified to optimize transmission for different wavelengths, narrow-band transmission, and broad-band transmission. Examples of different designs for broad-band transmissions are presented in the following references: "Broadband 2×2 Multi-mode Interference Coupler for T- and O-band Communication by Wavefront Matching Method, 14-16," Sugiyama, K. & Tsuda, H. (2015), https://doi.org/10.1364/IPRSN.2015.JM3A.32; "Index profile engineering of multimode interference couplers," New.design, 2(x), 76300X-76300X-8. https://dpo.org/10.1117/12.853236, Ortega-Monux, A., Molina-Fernandez, I. & Wanguemert-Perez, J. G. (2009).

Figure 6:
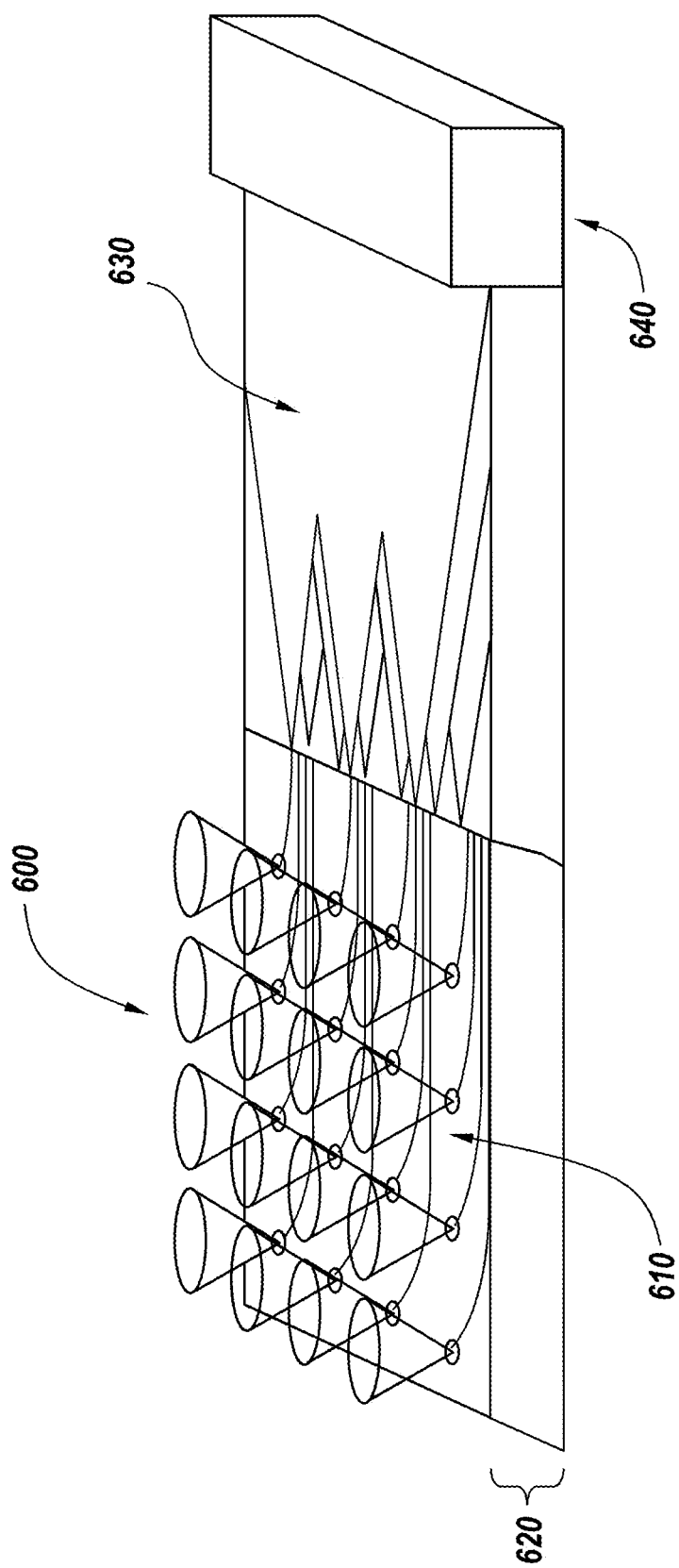
FIG. 6 shows an overview of the components of a flattened 2D compressive/transform imager, according to an embodiment of the present disclosure.

FIG. 6 shows an overview of the components of another embodiment of a compressive/transform imager of the present disclosure. As shown in FIG. 6, the compressive/transform imager can be a flattened 2D imager, which comprises a lens array 600 formed on a light collection array 610, consisting of apertures (e.g. grating couplers) and waveguides 620 formed below the light collection array 610. Additional layers of waveguides and apertures 620 can be formed below the first light collection array 610. A propagation/mixing region 630 is formed adjacent to the lens array 600. A detector array 640 is formed adjacent to the propagation/mixing region 630. In the compressive/transform imager of FIG. 6, the light is directed in-plane to a linear array.

Figure 7:
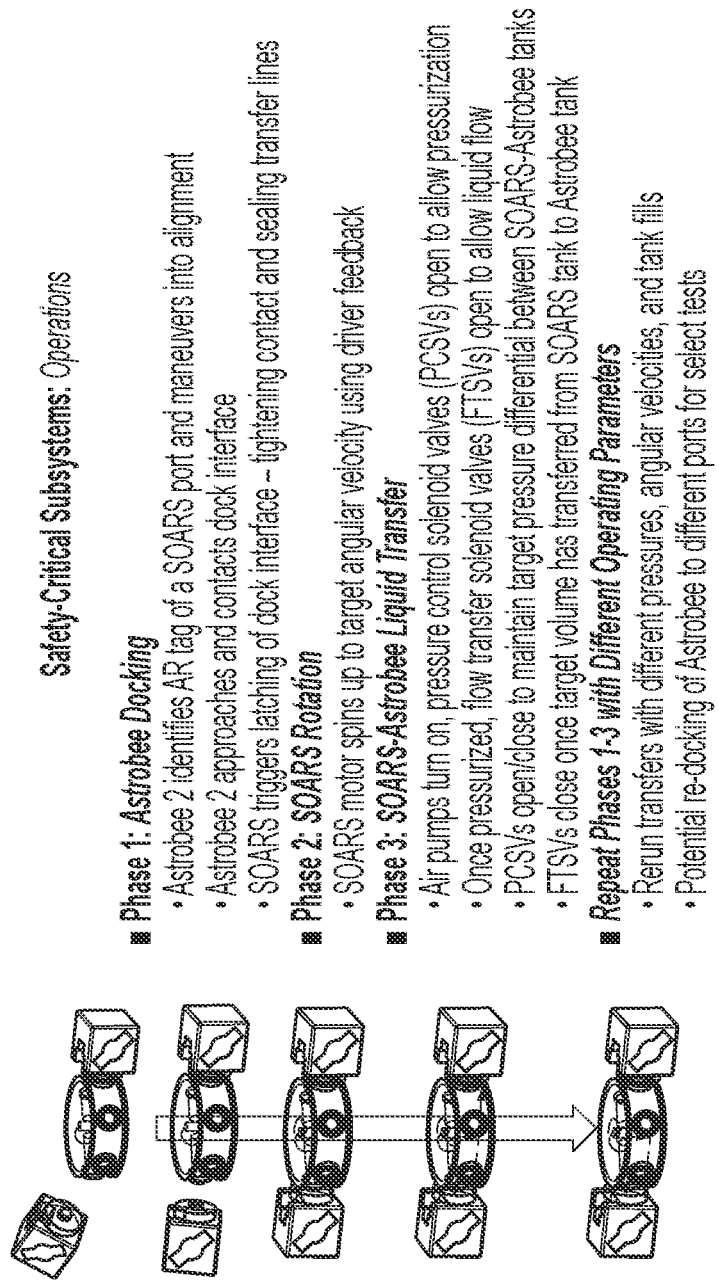
FIG. 7 shows the specifications for the flattened 2D compressive/transform imager of FIG. 6, according to an embodiment of the present disclosure.

FIG. 7 shows details of the compressive/transform imager shown in FIG. 6. As shown in FIG. 7, the compressive/transform imager includes a 400×400 lens array 700 at a 60 μm spacing and a one degree field of view. Approximately twenty (20) layers of waveguides 720 are formed below the light collection array 710. A propagation/mixing region 730 is formed adjacent to the lens array 700. A detector array 740 is formed adjacent to the propagation/mixing region 730. In the compressive/transform imager of FIG. 7, the light mixes in the propagation region 730. Each of the layers in the collection array 710 can include all optical elements, e.g. waveguides and grating couplers, to make it independent, removing the need for vertical optical interconnects between layers.

Figure 8A:
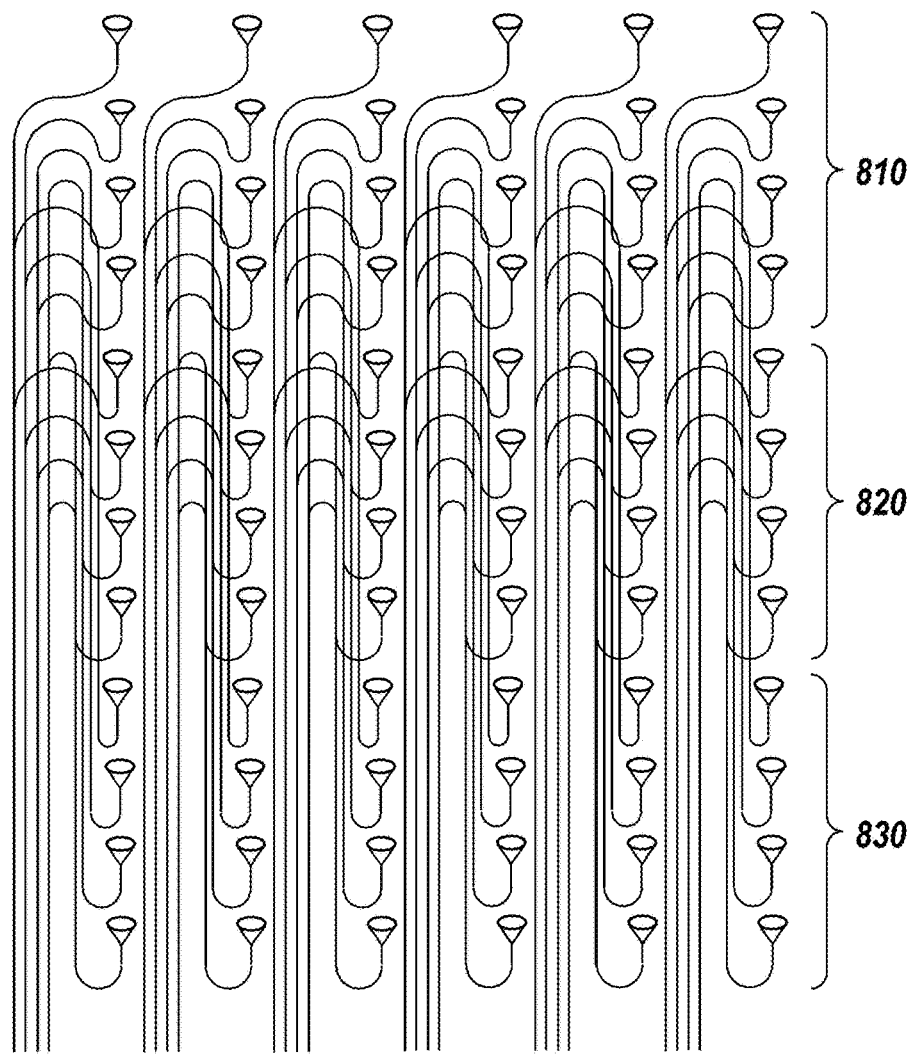
FIGS. 8A-8B show the output waveguide routing of a multi-layer device, according to an embodiment of the present disclosure.
Figure 8B:
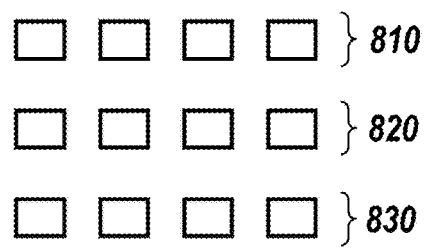

FIG. 8A shows a top view of a routing configuration of the array of the layers of waveguides 720 of FIG. 7. The array of waveguides 720 include a top layer 810, a middle layer 820 and a bottom layer 830. As shown in FIG. 8A, the path lengths are matched inside the array and output waveguides from separate layers are stacked vertically with respect to one another. The array can include additional layers in order to accommodate output waveguide spacing. FIG. 8B shows a side view of one group of outputs of the array of waveguides 720. Outputs from one column of inputs is shown in a cross-sectional view.

Figure 9A:
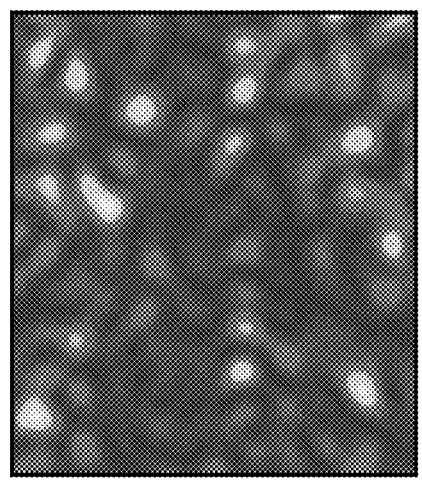
FIGS. 9A-9C show the processing to convert detector response of a flat 2D sensor to a 1D image value (e.g. star location), according to an embodiment of the present disclosure.
Figure 9B:
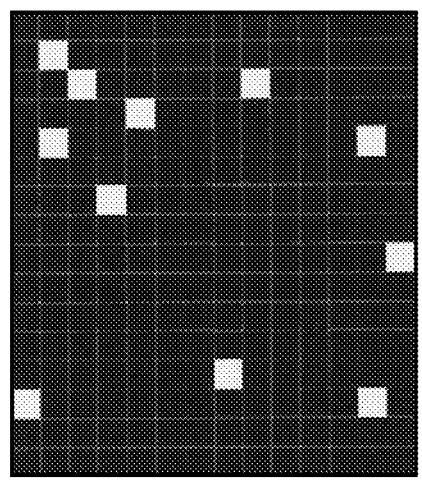
Figure 9C:
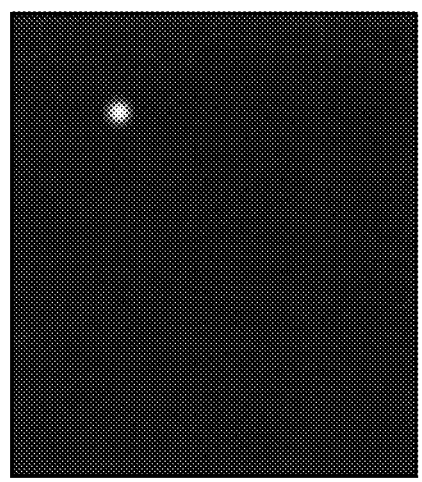

FIGS. 9A-9C show how the detector responses are processed to determine a star location. As shown in FIG. 9A, initially, the detector response are exponentially distributed. With an exponential distribution, the response as a function of detector number is deterministically random. As shown in FIG. 9B, thresholding yields a unique signature for the detector responses. In a non-limiting example, the thresholding step identifies the significant components of the matrix, which can include the top 5% of values in the matrix. The matrix shown in FIG. 9B after thresholding has been performed can be a binary matrix of 1 or 0 values. As shown in FIG. 9C, a look-up table can then be used to determine the location of a star based on the unique signature found in FIG. 9B. The lookup table contains data for the threshold detector responses expected for a grid of star locations within the field of view. The star location is determined by finding the star location that leads to the lowest error between the lookup table signature and measured signature.

Figure 10:
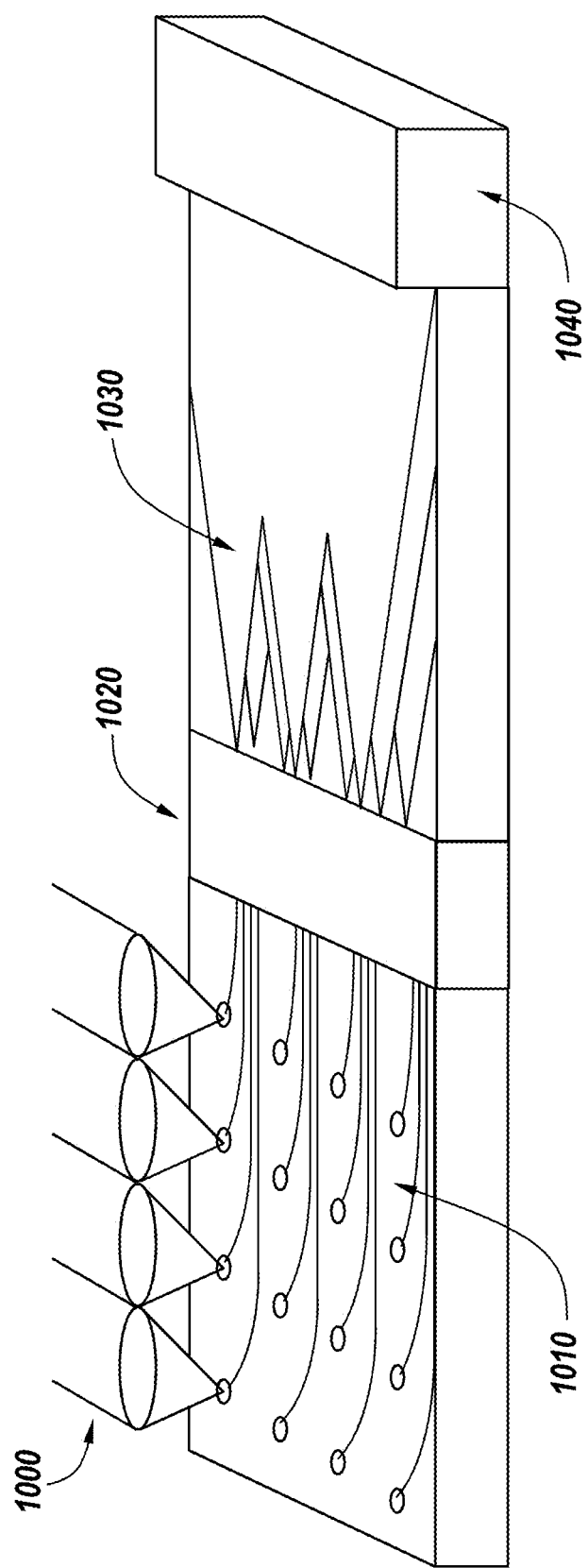
FIG. 10 shows an overview of the components of a wide field-of-view (FOV) compressive/transform imager, according to an embodiment of the present disclosure.

FIG. 10 shows an overview of the components of another embodiment of a compressive/transform imager of the present disclosure. As shown in FIG. 10, the compressive/transform imager includes a lens array 1000 formed on a light collection array 1010 to which light is directed. The lens array 1000 can be moved to scan a field of view. A MEMS actuator 1020 for controlling phase shift is formed adjacent the lens array 1010. A propagation/mixing region 1030 is formed adjacent to the MEMS actuator 1020. In a non-limiting example, the MEMS actuator is formed on the same substrate as the mixing region. The mixing region allows the light to interfere in a somewhat random way, similar to the multi-mode interferometers described earlier in this document. In the case that the light collection array consists of multiple layers, the mixing region can have a larger extent perpendicular to the plane of the device (e.g. micrometers instead of 100 s of nanometers, as is typical in many integrated photonic devices). A detector array 1040 is formed adjacent to the propagation/mixing region 1030. In the compressive/transform imager of FIG. 10, the light mixes in the propagation region 1030. The collection array 1010 can include all optical elements, e.g. waveguides and grating couplers, to make it independent, removing the need for vertical optical interconnects between layers. In the compressive/transform imager of FIG. 10, the light is directed in-plane to a linear array.

Figure 11:
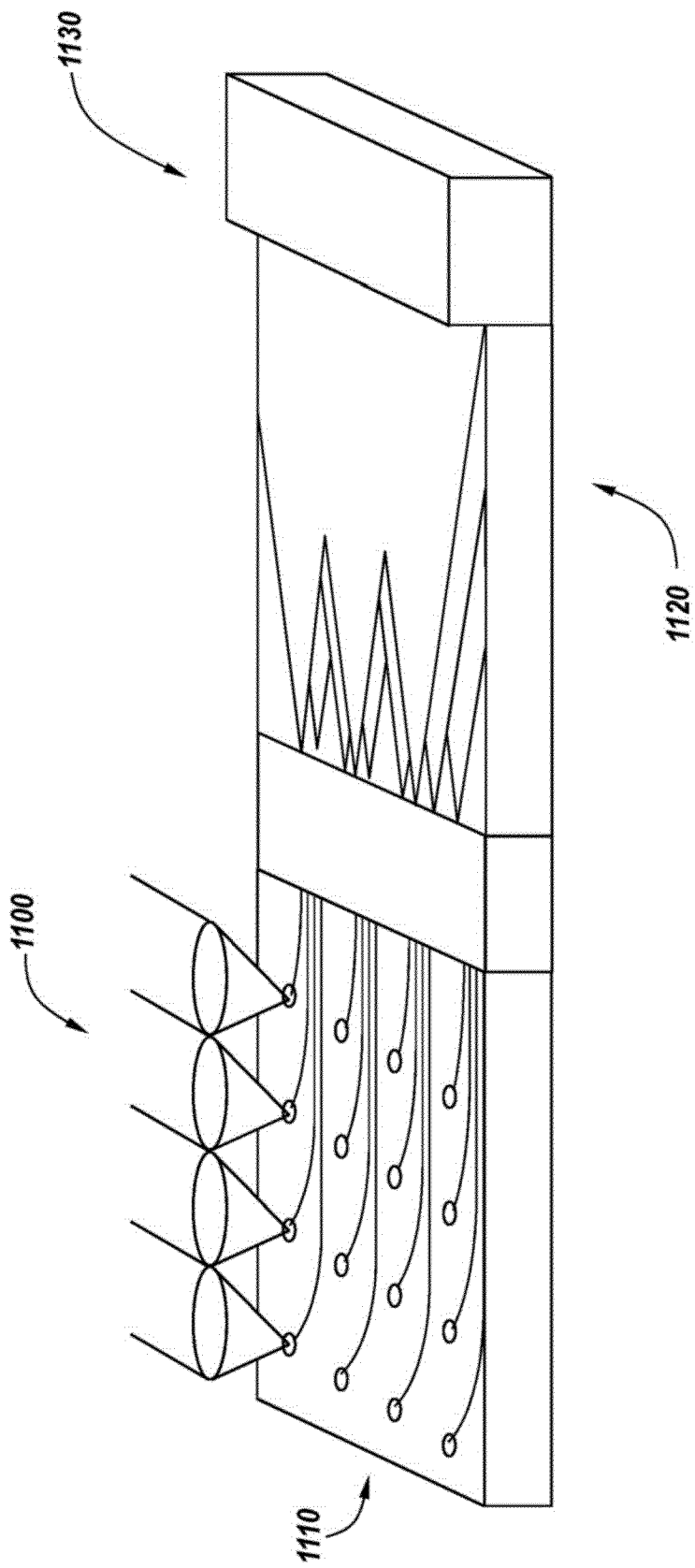
FIG. 11 shows the specifications for the wide field-of-view (FOV) compressive/transform imager of FIG. 10, according to an embodiment of the present disclosure.
Figure 12A:
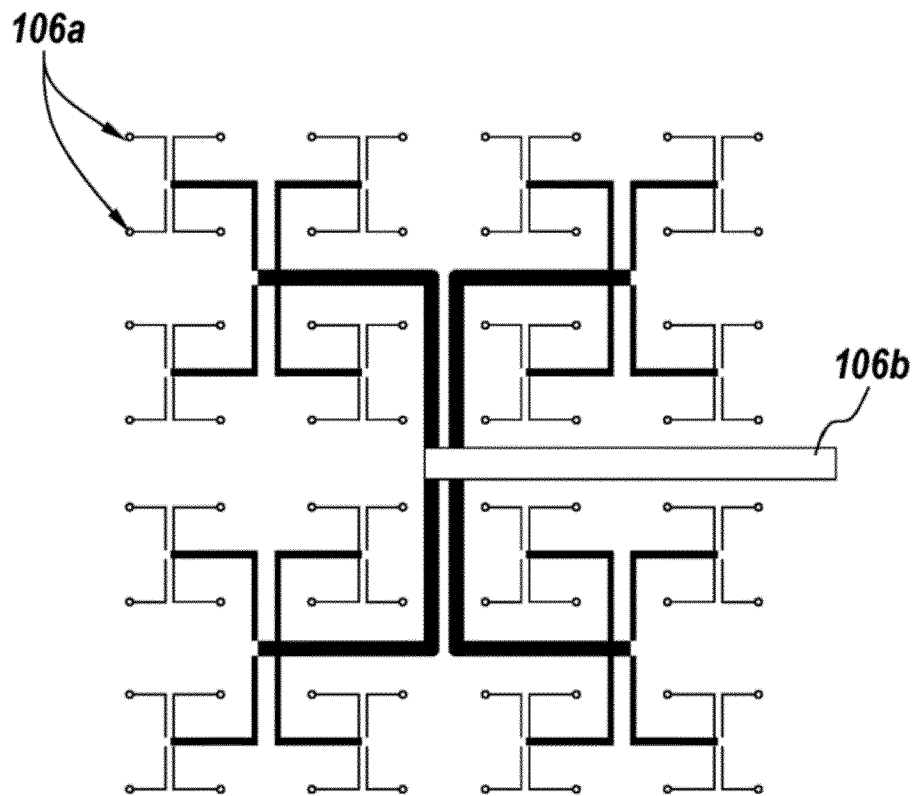
Figure 12B:
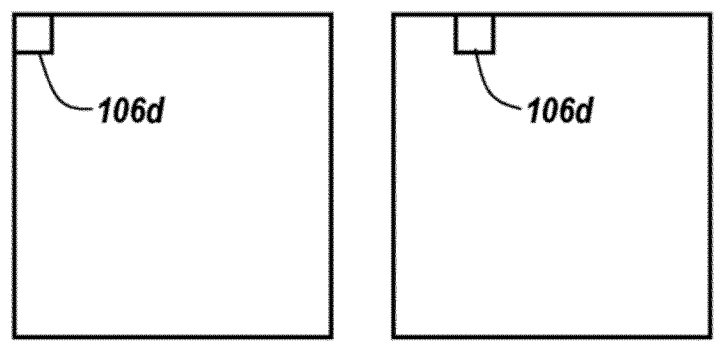
Figure 14:
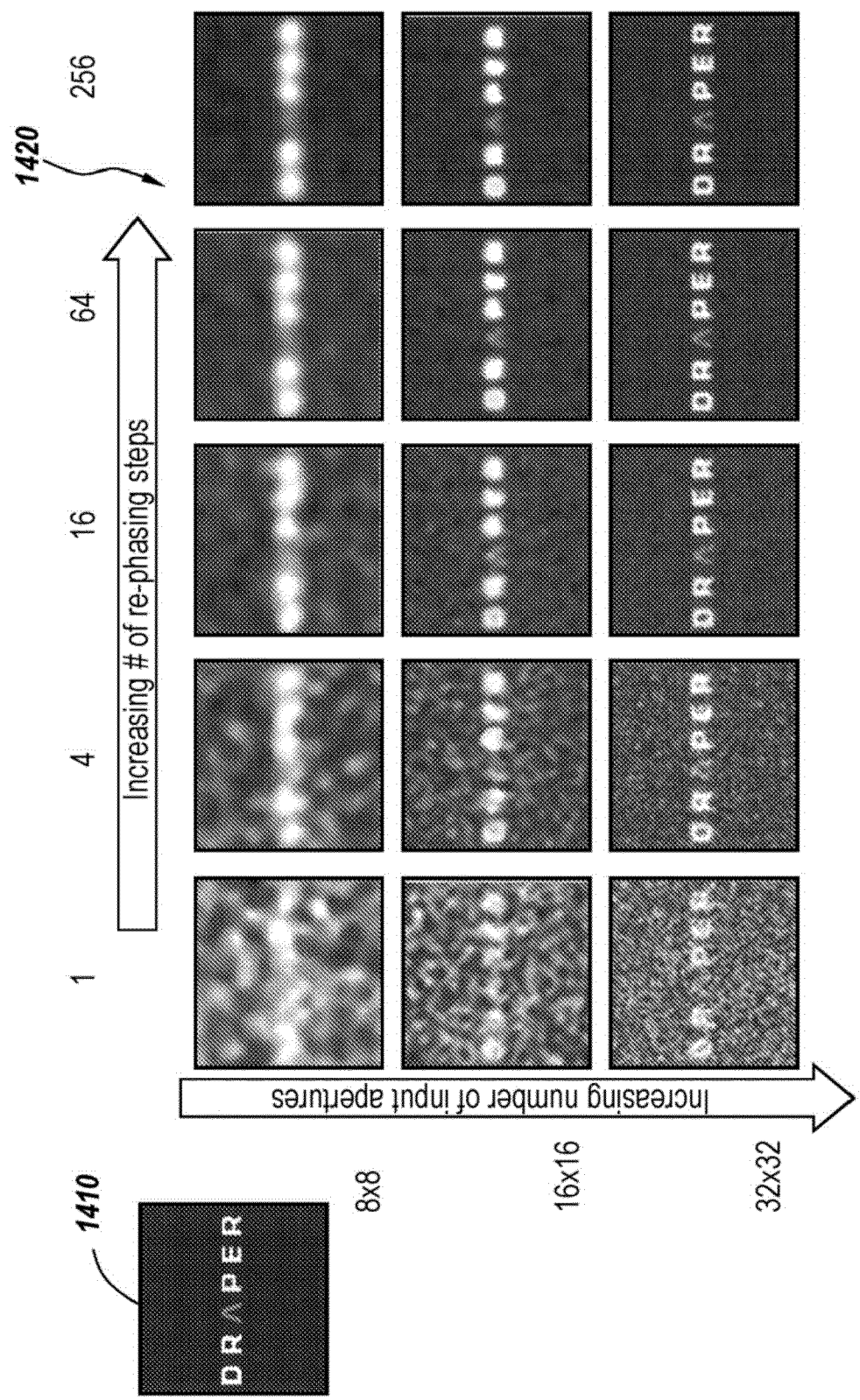
Figure 15A:
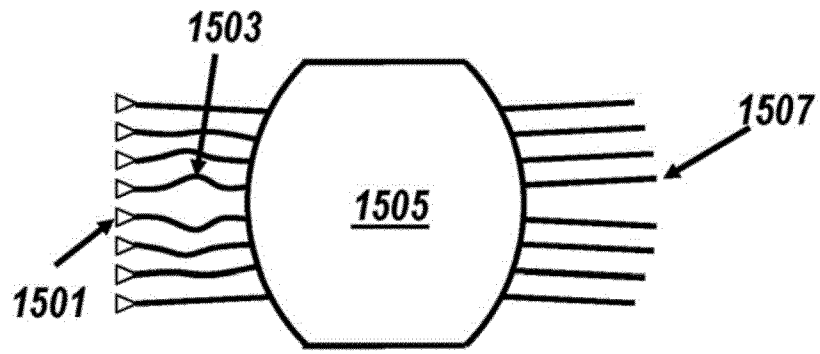
Figure 15B:
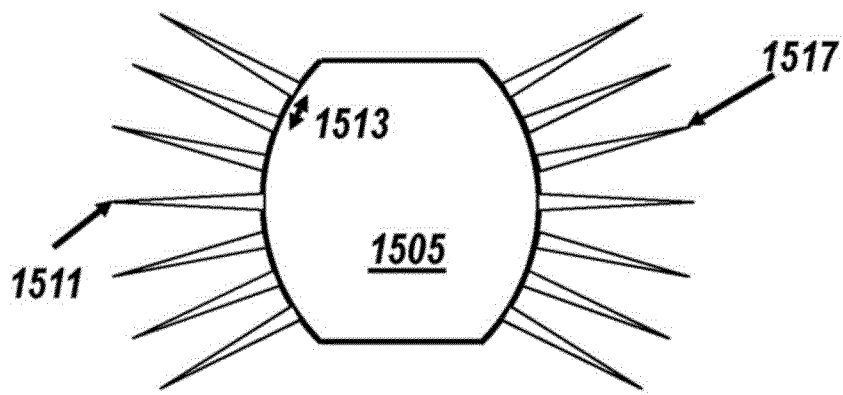
Figure 15C:
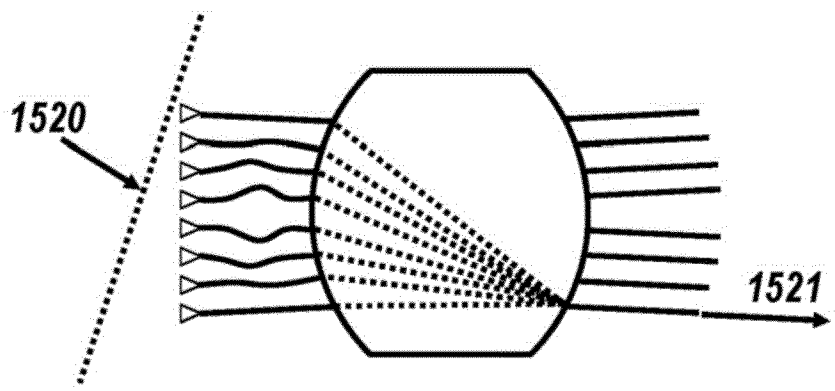
Figure 16A:
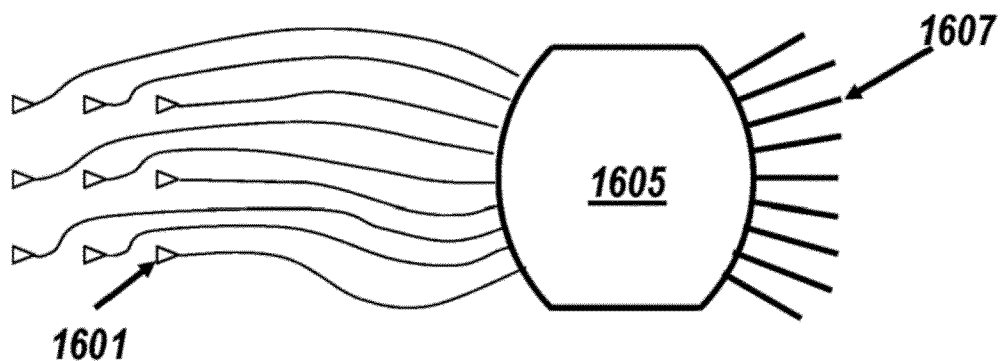
Figure 16B:
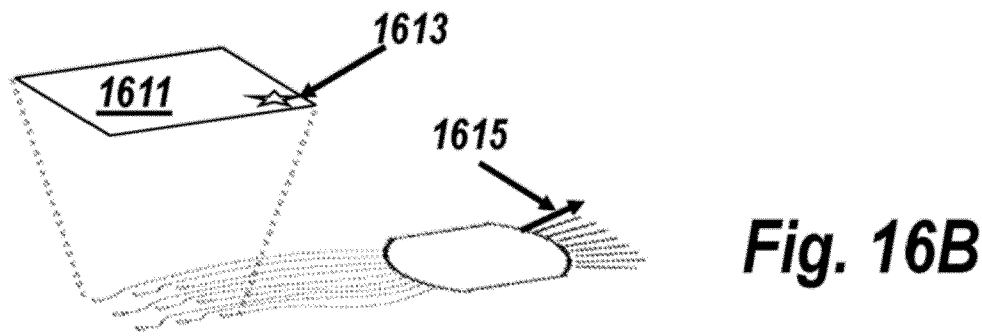
Figure 16C:
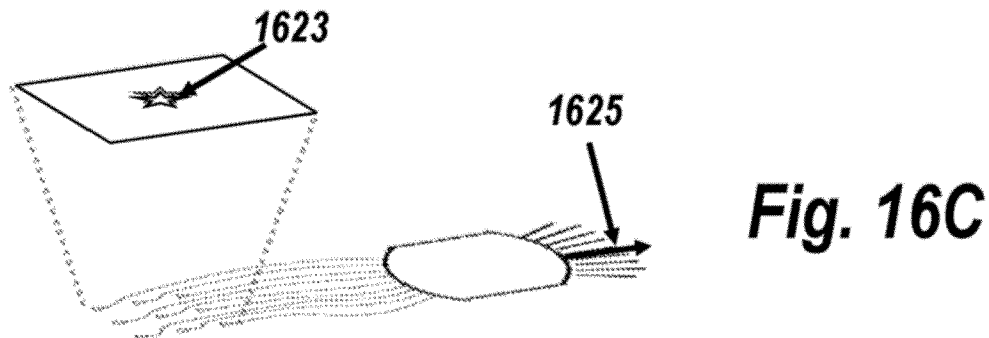
Figure 17:
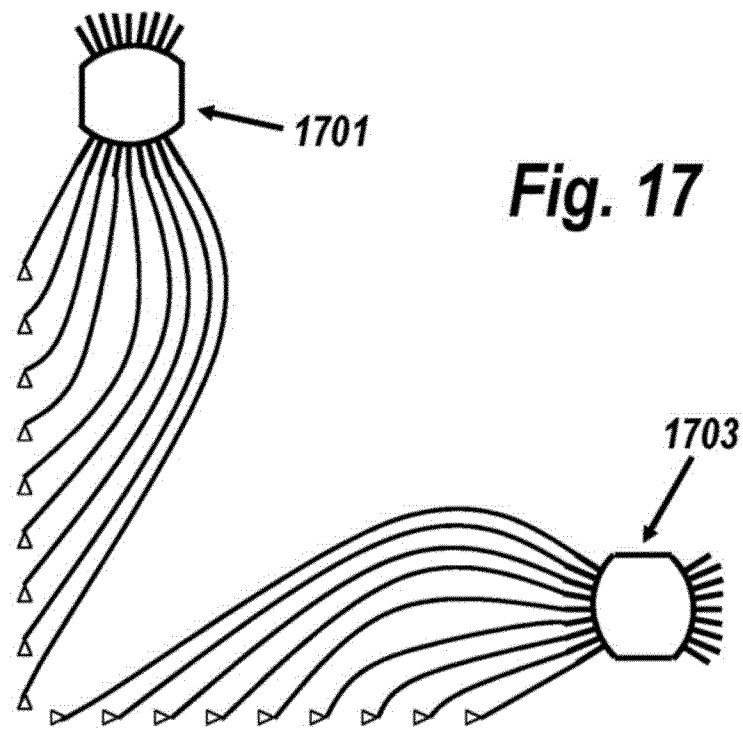
Figure 18:
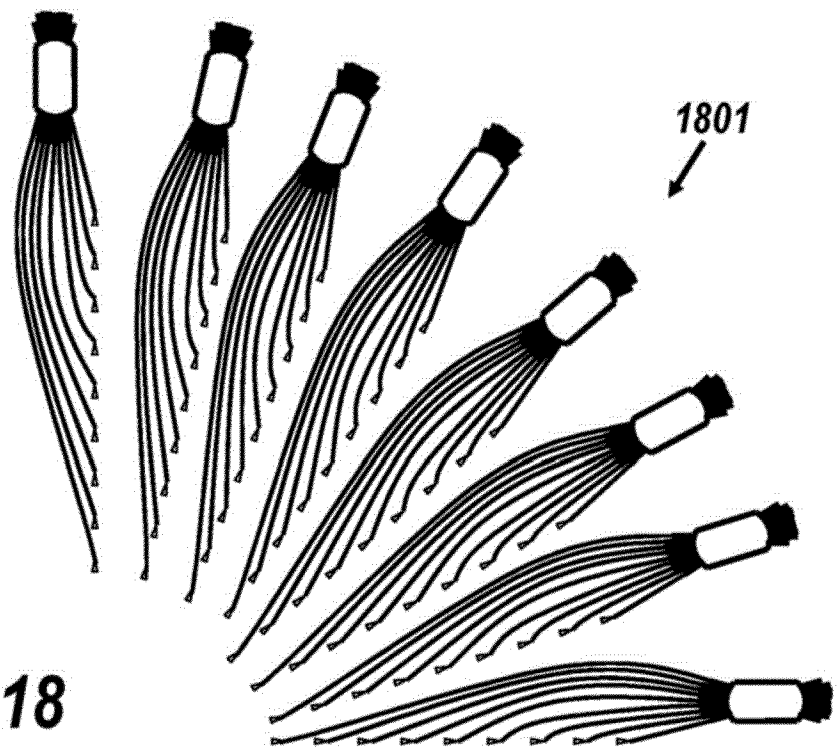
Figure 19:
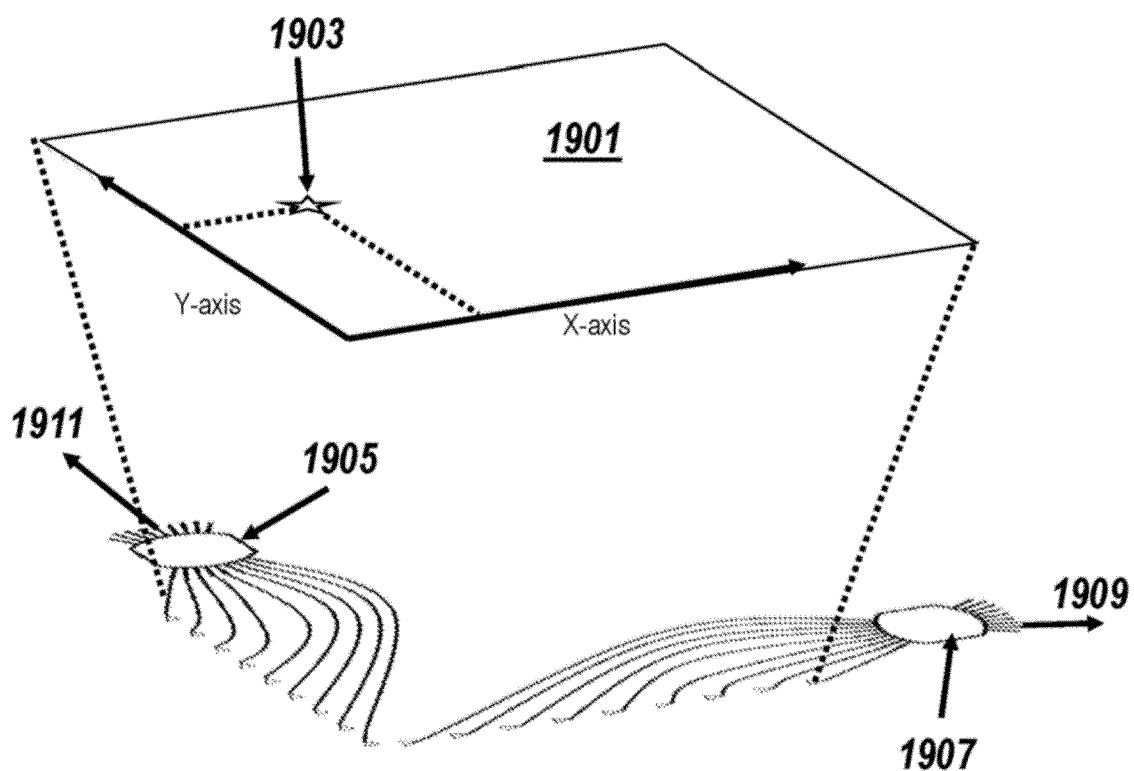
Figure 20A:
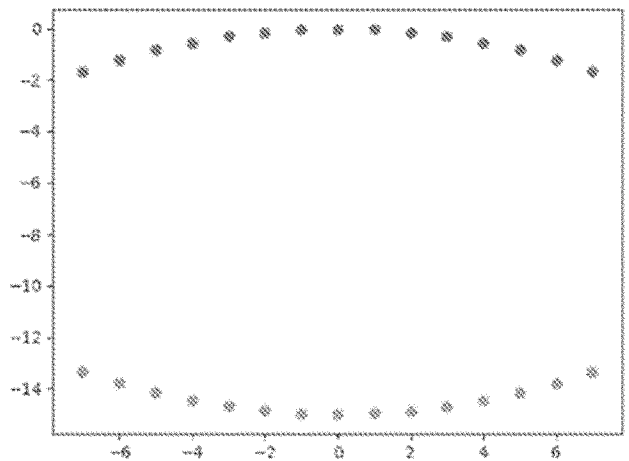
Figure 20B:
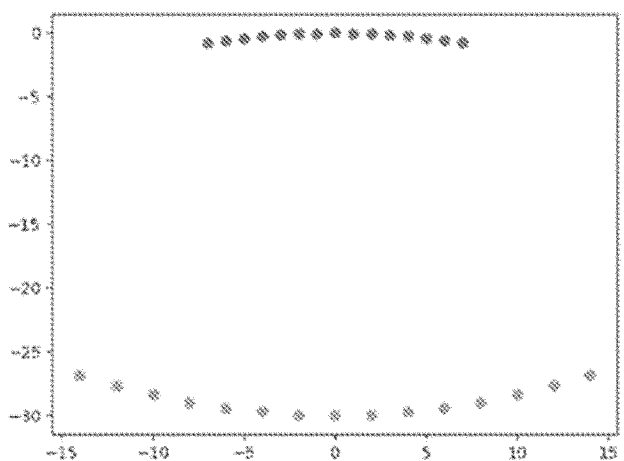
Figure 21A:
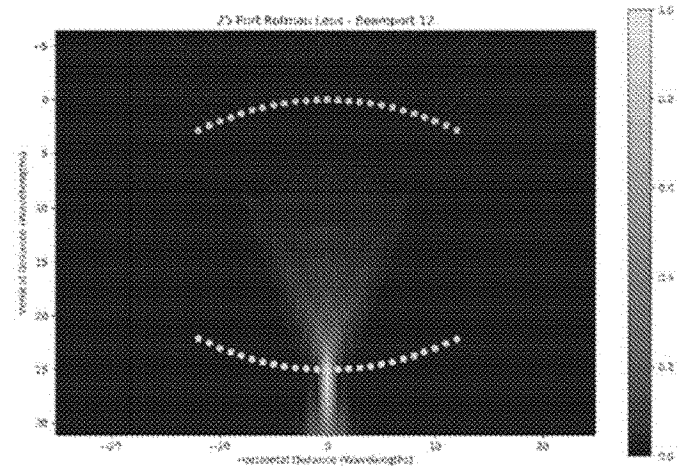
Figure 21B:
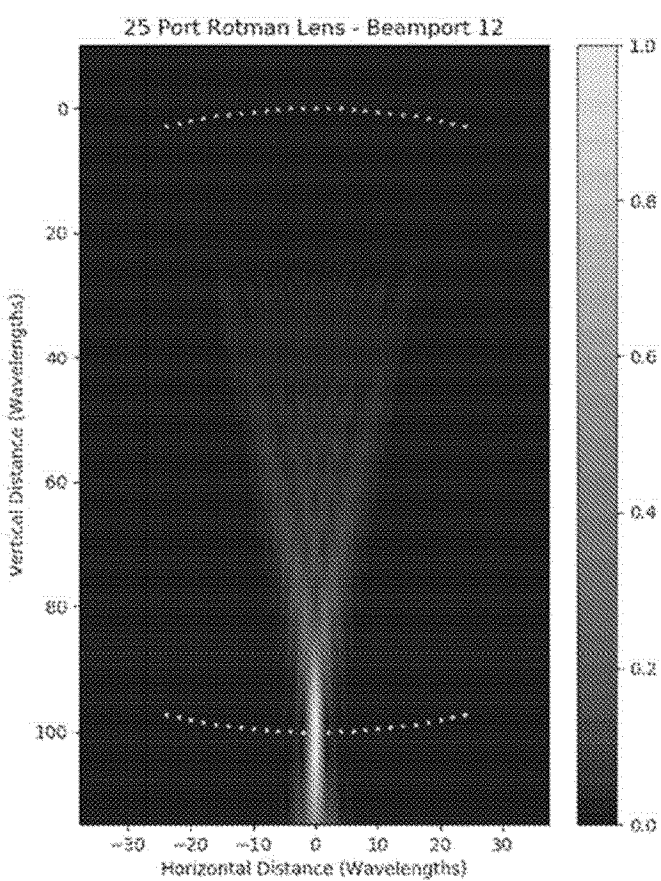

FIG. 11 shows details of the compressive/transform imager shown in FIG. 10 that can be used to process data to locate starts. As shown in FIG. 11, the compressive/transform imager includes a 90×90 lens array 1100 at a 250 μm spacing and a 0.25 degree instantaneous field of view. FIG. 11 shows one layer of waveguides 1110 directed into the edge of the mixing region 1120. A propagation/mixing region 1120 is formed adjacent to the lens array 1100. A detector array 1130 is formed adjacent to the propagation/mixing region 1120. In the compressive/transform imager of FIG. 11, beam steering is accomplished by a lens array movable in the x/y plane to focus on side lobes of the array of collection apertures, and a MEMS actuator for phase shifting, which accounts for path differences at different viewing angles. A multimode interferometer is used to mix light from inputs.

Before usable data can be extracted from the compressive/transform imager, the imager must be characterized. The characterization process for using the compressive/transform imager as a star tracker is presented below. However, as mentioned above, the compressive/transform imager can be used for other applications such as smartphone cameras, etc. i.e. a general compressive/transform imager. The characterization process for a general compressive/transform imager is similar to that of a compressive/transform imager designed as a star tracker. Characterization should be performed in a basis that the detected images are sparse in. For example, a star tracker can effectively be calibrated using a point source, while a general imager can be calibrated in a discrete cosine transform, Fourier, Haar, or related basis.

In order to predict the performance of the compressive/transform imager, the wavelength-dependent scattering matrices of all of the MMI's in the imager need to be calculated. This can be done using simulation methods such as eigenmode expansion solvers, finite-difference time-domain methods, and beam propagation methods. The scattering matrices of all device components are combined into a device scattering matrix based on the device design. This device scattering matrix is used to determine the device output as a function of point source location within the field of view.

Figure 12A:
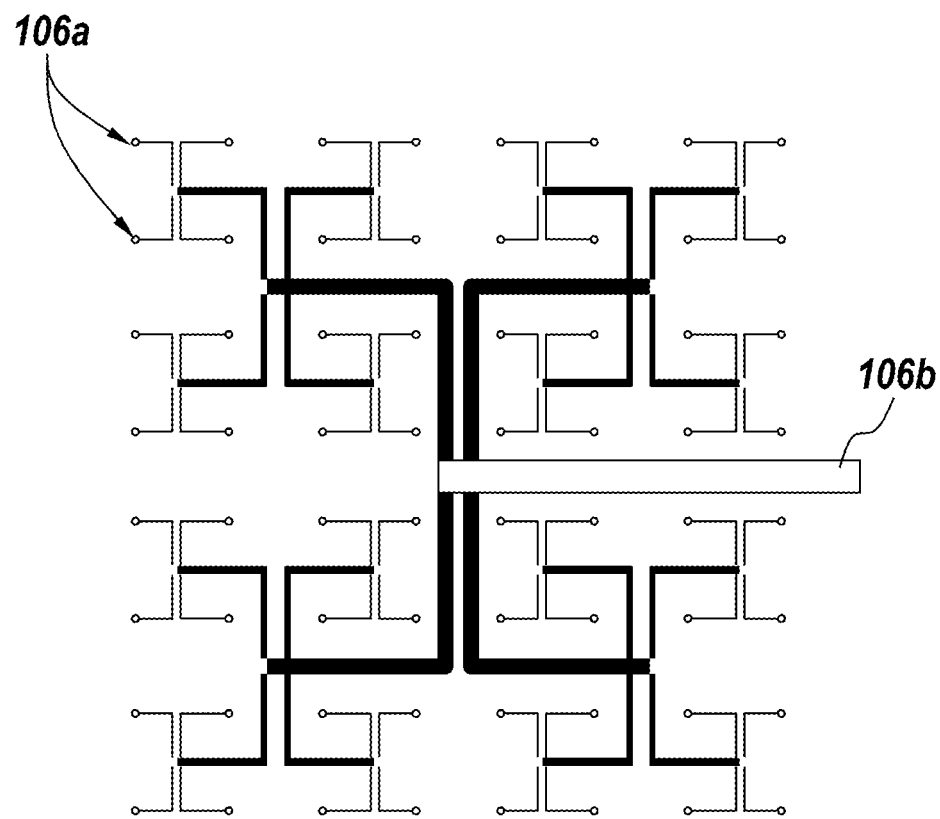
FIGS. 12A-12B show a schematic view of a sample system for characterizing the compressive/transform imager, according to an embodiment of the present disclosure.
Figure 12B:
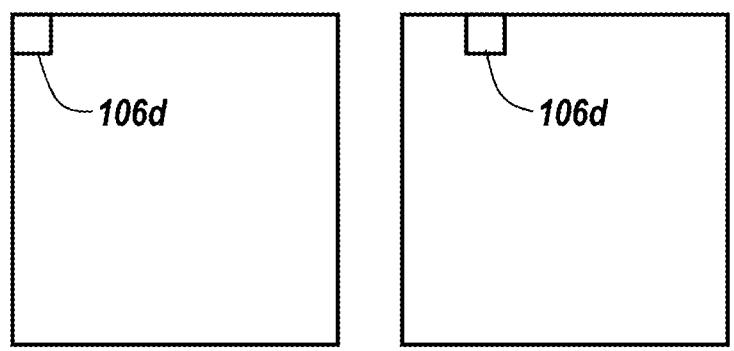

Characterization of the compressive/transform imager can be done by recording the output of the imager as a point source of light is moved across a grid of points within the field of view. An example system for characterizing the compressive/transform imager is shown schematically in FIGS. 12A-12B. Characterization information for the compressive/transform imager output as a function of point source location must be recorded for a large number of grid points, "n×n". FIG. 12B shows an example of two representative point source locations 106d within the field of view. The number of points "n×n" that must be recorded for characterization is defined by the number of input ports N×N of the imager. The theoretical minimum number of points that must be recorded corresponds to n=N, but for good performance, it is typically required for n to be greater than 4×N. This results in a matrix P of "$N_{out}$×n×n" data points, where $N_{out}$ is the number of output ports of the imager. As shown in FIG. 12A, there are 16×16 input ports 106a and 32 output ports 106b. In this example we take "n=12.5×N", resulting in a calibration matrix P consisting of "32×200×200" data points.

When using the compressive/transform imager as a star tracker looking for a single star, the measured output is compared to the elements of matrix P. The location of the star within the field of view is determined by the point within the field of view that gives the minimum Euclidian distance between the measured output and the characterization information. Because the brightness of the imaged star is not necessarily the same as the light source used for the characterization of the imager, a multiplicative factor must be added in to the comparison between matrix P and the measured signal. The correct star brightness and location within the field of view are determined by minimizing the sum squared error, represented by Equation (1) below.

$$e = \Sigma_i [M_i - P_i b]^2 \quad (1)$$

where $M_i$ is the measured output, $P_i$ is the predicted output, and b is a scaling factor for the brightness of the star. In one example embodiment, solving for the constant b can be performed as follows: given two vectors, M and P, we desire the constant b which minimizes sum$(M_i-bP_i)^2$. We can get the minimizing b by taking the derivative with respect to b and setting it equal to zero: sum$(-2P_i*(M_i-bP_i))$=0. Dividing both sides by −2 and distributing gives sum $(P_i*M_i-bP_i^2))$=0. Breaking apart the sum and pulling b out: sum$(P_i*M_i)-b*$sum$(P_i^2)$=0. Rearranging to solve for b: b=sum$(P_i*M_i)$/sum$(P_i^2)$).

These methods can be used predict the performance of a device based on numerical calculations of device performance, and can be used to characterize a fabricated device based on measured output data.

Multiple stars can be located using the compressive/transform imager as a star tracker and using the process described above. While looking for the location of one star within the field of view, other stars in the scene add Gaussian noise. For example, if there are 7 stars in the scene, a correct guess of star location will have the noise from 6 stars because the output of one star matches the corresponding values in the matrix P. An incorrect guess, however, will have a noise level from 8 stars due to all 7 stars in the scene, as well as the incorrect guess of the star location. This process can be used to find all stars in a scene or background subtraction can be used to remove noise due to stars that have already been found. A larger number of output ports, $N_{out}$, provides better differentiation, especially for larger number of stars or sources or lights in the scene. The number of stars or features, k, that can be located within the field of view is proportional to $\log(N_{out})$. The probability of correctly locating the positions of a small number of stars or features is higher for small k than large k.

The runtime of the algorithm is $[O(n^2 k \log(n))]$, where k=the number of stars or features in the scene. Any additional optimizations, for example, taking into account the brightness of the star through a least-squares optimization, adds a constant factor C to the runtime of the image extraction algorithm, which leads to a generalized runtime of the algorithm of $Cn^2 k \log(n)$.

Generally, the performance of typical star trackers is adversely impacted by chromatic aberration. The compressive/transform imager disclosed herein can take into account the spectrum of a star in the field of view. This additional correction requires characterizing the sensor for a series of different wavelengths. Given the black-body spectrum of stars, the spectrum will be approximately linear within a bandwidth of several 100 nm in the infrared spectrum. Equation (1) above can be expanded to take into account the slope of the spectrum, as shown in Equation (2) below:

$$e = \Sigma_i [M_i - \Sigma_j P_{ij}(aX_j + b)]^2 \qquad (2)$$

where $aX_j + b$ represents to brightness of the star as a function of wavelength, $X_j$.

Runtime of the algorithm is increased by a constant factor by adding analysis of the star's spectrum. The term representing brightness as a function of wavelength can also be represented by a higher order polynomial. This introduces multiple solutions and further increases runtime of the algorithm, but can be used to provide more detailed information about the spectrum of stars within the field of view. Correcting for the spectrum of the star becomes more important the more matrix 'P' varies as a function of wavelength and the more the spectrum of the star or light source varies as a function of wavelength. The techniques described above can be implemented to use a flat compressive/transform imager as an integrated, on-chip spectrometer.

Alternatively, the transfer matrix of the imager can be recovered during characterization. The input scene, $I_{scene}$, is mapped to an output vector (signal at the output ports of the imager), $I_{measured}$, by a transfer matrix, $M_{transfer}$, by the relationship $I_{measured} = M_{transfer} I_{scene}$. If the transfer matrix is known, the scene can be recovered by $I_{scene} = M_{transfer}^{-1} I_{measured}$. The transfer matrix will be size $N_{out} \times [N \times N]$. $M_{transfer}$ can be recovered using two methods. A bright point source can be scanned across the field of view, essentially producing $I_{scene}$ as a single bright pixel and no signal elsewhere, which recovers the columns of $M_{transfer}$ one at a time. The imager can also be illuminated by a large number of random (independent) input scenes to produce uncorrelated pairs of matrices $I_{scene}$ and $I_{measured}$. The number of input scenes is $>N_{out} \times N \times N$. This means a greater number of random input scenes than point source locations is required, however, the integration time for each scene in this calibration method is shorter because approximately half the scene has signal, rather than a single point. A least-squares best-fit $M_{transfer}$ or $M_{transfer}^{-1}$ can be calculated from this information. $M_{transfer}$ must be square to be invertible, meaning that this method of imager characterization cannot be done when output ports of MMIs in the compressive imager are dropped. As used in this disclosure, calibration and characterization may be used interchangeably.

Accounting for wavelength in the calibration can be done using several approaches. One example is to account for wavelength within the transfer matrix described above. In this case, resolution is sacrificed (by a constant factor of $N_{wavelengths}$) in exchange for wavelength information because the transfer matrix has a constant size $N_{out} \times [N \times N]$. Alternatively, the entire calibration process and transfer matrix recovery must be completed for each wavelength independently. This results in $N_{wavelengths}$ transfer matrices.

Any mathematical basis and transform can be used to recover scenes from the output of a compressive/transform imager, so long as the scene is sparse in the chosen basis. Discrete sine and cosine transforms are a good choice for a general compressive/transform imager because natural scenes tend to be sparse in a discrete cosine basis and related bases (e.g. Haar or Fourier). The outputs of the imager are used to determine which frequency components are present in the scene. The number of frequency components or features that can be recovered from the scene relates to the number of output ports the imager has (i.e. $c \, k \, \log(n)$, where k is the number of features and c is a constant factor). This method can improve the recovery of general scenes.

At least some embodiments of the present disclosure can result in improved utility in general imaging applications (i.e. imaging complex scenes). Complex scenes require the ability to collect a larger number of unique data points with the imager. This can be achieved by increasing the number of input ports, which increases the size of the imager and complexity.

An alternative approach is to "re-phase" the input array. Phase shifters on each input port (e.g., heaters to shift the refractive index in the waveguides and total phase accumulated by a signal from that port before it reaches the first mixing region/MMI) can be used to reconfigure the relative phases of signals from different input ports before they get mixed. This will change the transfer matrix of the device and lead to a different correlation between phase front angle relative to the imager and signal intensities measured at the output ports. The amount of variability introduced by phase shifters is maximized if each phase shifter can introduce an arbitrary phase shift of $-\pi$ to $+\pi$ (or 0 to $+2\pi$). Each phase configuration with the same imager provides additional information. Taking data with a large number of phase configurations enables recovery of more complex scenes. The number of phase configurations is preferably between 4 and 256. The number chosen will be determined by a trade-off of image quality (e.g. sharpness, noise, contrast, dynamic range) and exposure time. A larger number of phase configurations improves image quality, but increases time required to take the image.

In order to make use of "re-phasing" of the imager, appropriate calibration should be completed. There are several options. For example, calibration can be performed as described herein for each phase configuration of the imager, resulting in a separate matrix P for each Phase configuration.

Another option is to determine the transfer matrix of the imager, $M_{transfer}$. Once $M_{transfer}$ is known it can be multiplied by the matrix representing the phase shifts applied to each input port to determine the transfer matrix for any arbitrary phase configuration.

Figure 13:
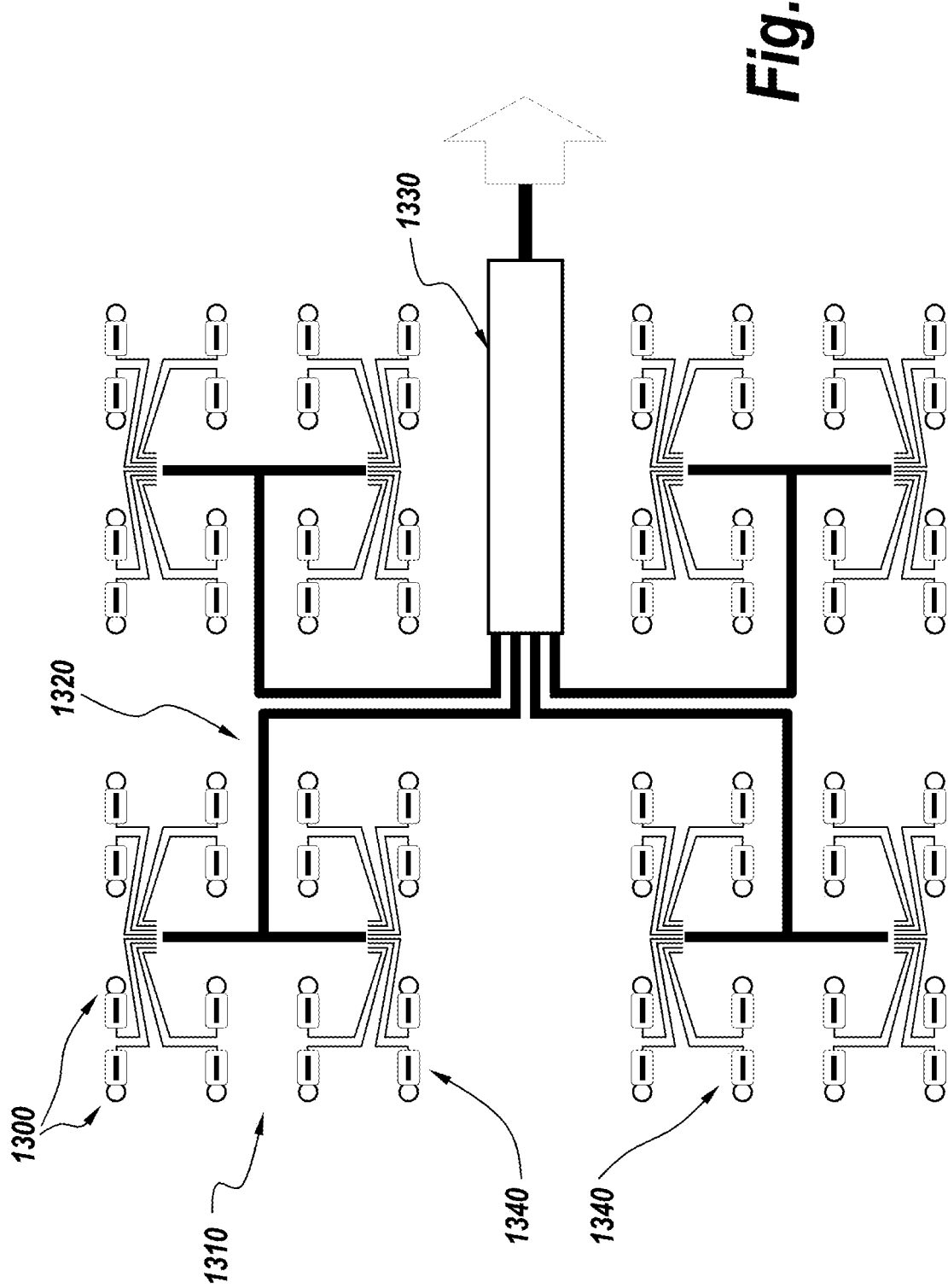
FIG. 13 is a representative schematic of an array of 8×8 input ports, each of which has a phase shifter on each aperture capable of a phase shift of 0-2π, according to an embodiment of the present disclosure.

FIG. 13 is a representative schematic of an array 1310 of 8×8 input ports (e.g. grating couplers), each of which has a phase shifter 1340 on each aperture 1300 (e.g., grating coupler) capable of a phase shift of 0-2π (e.g., thermal phase shifter). Waveguides 1320 are routed from each input region through either a series of mixing regions (MMIs) or at least one large MMI/mixing region 1330 (or several layers of MMI's) where signals from all 64 input ports are mixed. Path lengths should be matched with a tolerance of approximately one wavelength. At the end of the MMI, which mixes all signals together, all output ports are kept and routed to detectors. Alternatively, the MMI can be terminated at the edge of the chip/mixing region and imaged directly with a detector (e.g. a detector array bonded directly to the end of the MMI).

Figure 14:
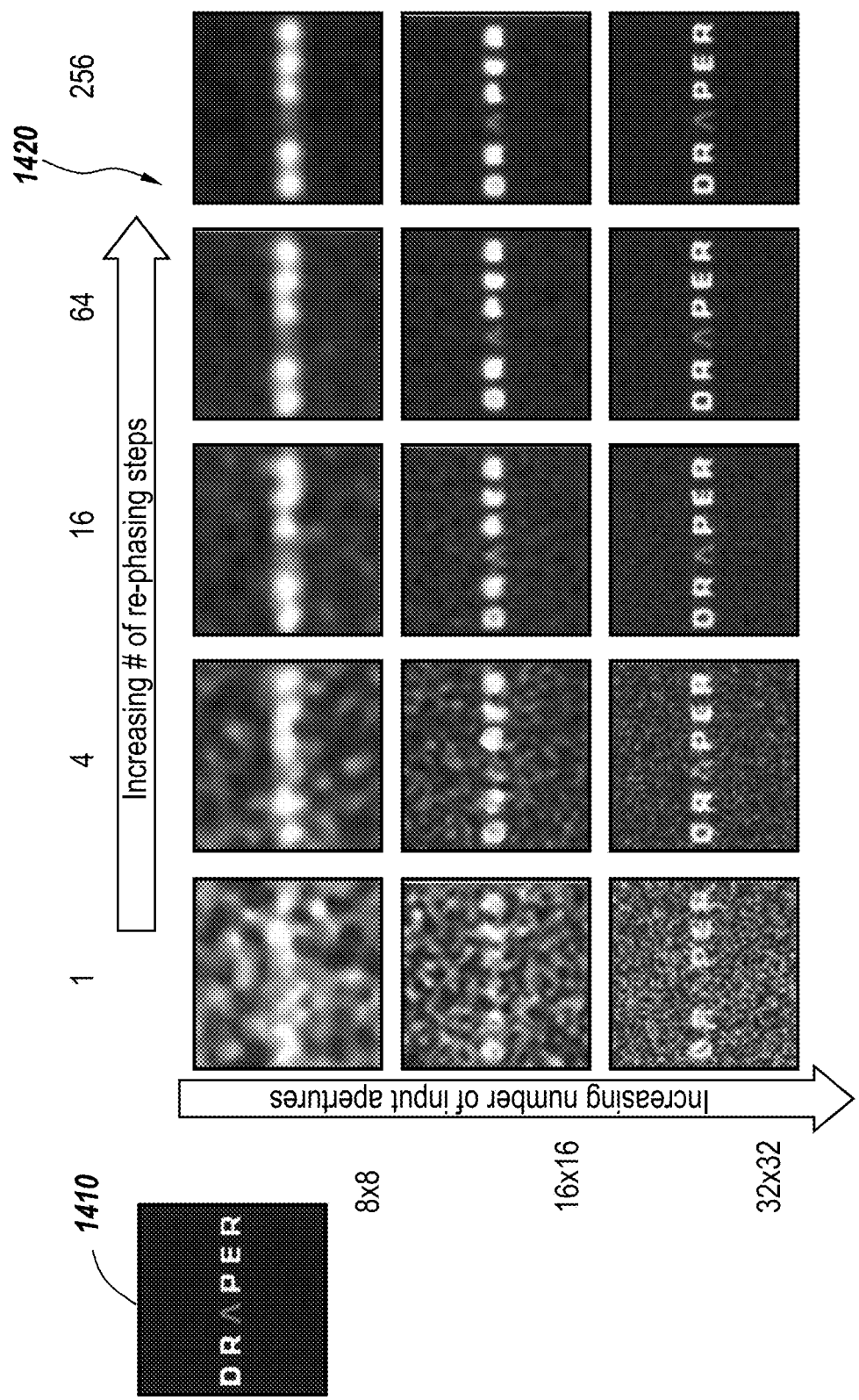
FIG. 14 shows simulation results of a random imager which makes use of re-phasing, according to an embodiment of the present disclosure.

FIG. 14 shows simulation results of a random imager which makes use of re-phasing. The "original object" or "input" 1410 is what the device takes an image of. The recovered image 1420 is shown as a function of the number of apertures in the imager (8×8, 16×16, 32×32) and the number of re-phasing steps (1, 4, 16, 64, 256). The image quality improves with the number of input apertures as well as the number of re-phasing steps. Above approximately 256 re-phasing steps, the image quality plateaus. In this case, the simulation assumes all output ports of the device are kept. The image quality recovered by an imager making use of re-phasing is limited by the resolution of the imager. This is a function of the size of the input array (number of elements and element spacing) and represents a fundamental limit for all imaging systems, regardless of configuration (e.g. a CMOS imager with 8×8 array of pixels at the focal plane of a lens would recover a similarly blurry image as the 8×8 random imager with re-phasing).

Re-phasing allows simplification of the imager without loss of information. Dropping output ports from MMIs can simplify the layout and fabrication of a random imager, but leads to loss of information. However, re-phasing can be used to regain this information. For example, a random imager with 32×32 array of input ports with 512 output ports (half as many output ports as input ports) can recover as complex a scene as a 32×32 array of input ports with 1024 output ports, so long as twice as many re-phasing steps are used and the combination of phases is sufficiently unique.

In another example embodiment, an amplitude adjustment can be made prior to directing light to the mixing region rather than a phase shift. An amplitude adjustment can similarly modify the transfer matrix of the imager, and this modification can be represented by a complex matrix.

The compressive/transform imager described herein can greatly reduce the number of waveguides needed. This makes it possible to implement the compressive/transform imager in a single layer of waveguides, or in a small number of layers of waveguides. Multi-layer designs can also be implemented without the need for vertical optical interconnects, greatly simplifying design and fabrication. Use of the compressive/transform imager requires characterization, which introduces the benefit that allows effects resulting from fabrication variations to be taken into account, making the imager robust to variability between the design and the actual fabricated device.

Figure 15A:
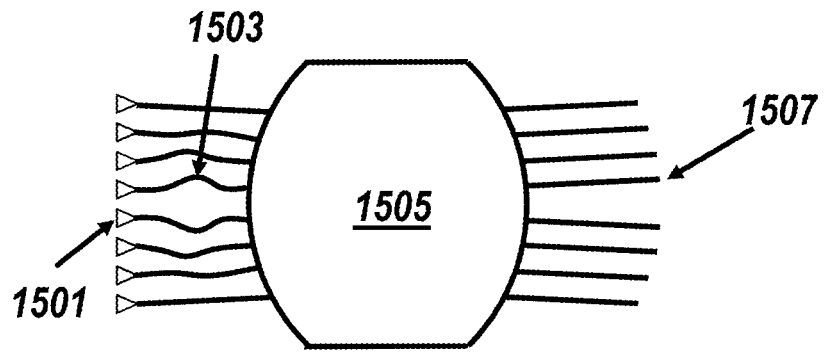
FIG. 15A-15C show a schematic view of sample Rotman lenses used as the waveguide mixing region in a compressive/transform imager, according to an embodiment of the present disclosure.
Figure 15B:
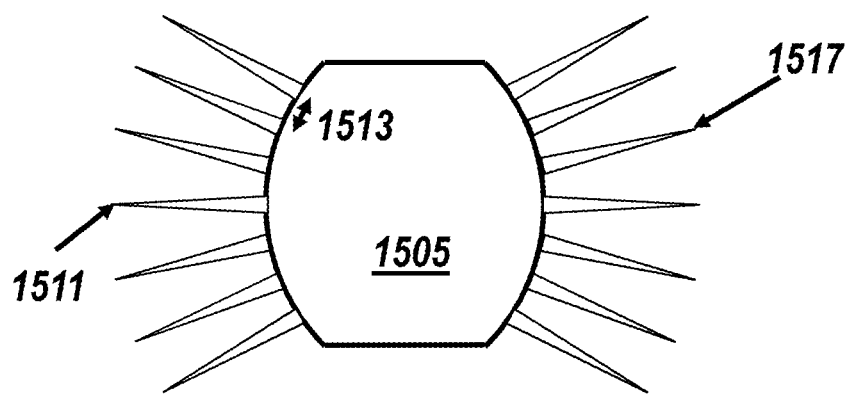
Figure 15C:
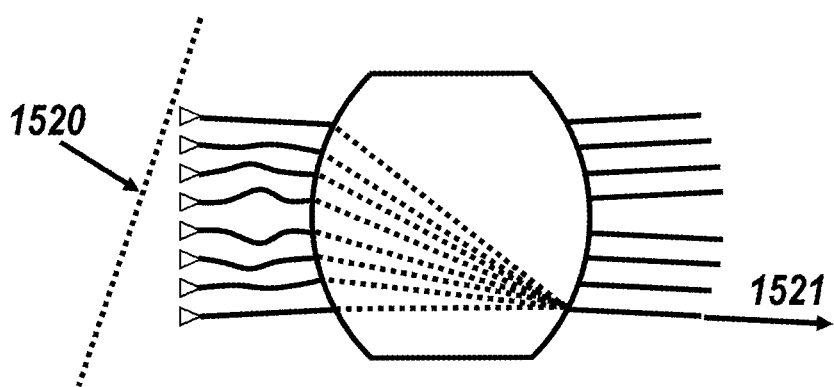

FIGS. 15A-15C show examples of a Rotman lens that can be used as the mixer in a compressive/transform imager, according to embodiments of the present disclosure. In a non-limiting example, a Rotman lens 1505 can be used as a true time delay device. In the example shown in FIG. 15A, the Rotman lens 1505 is connected to a number of light collection apertures 1501 (e.g. gratings), and path matching 1503 is ensured between all apertures and the input port of the Rotman lens. A number of output ports 1507 can be connected from the Rotman lens to one or more detectors. In the Example shown in FIG. 15B, the input waveguides 1511 are spaced a distance 1513 of between <λ and 2λ between one another. The input ports 1511 can be tapered waveguides configured to reduce reflections as light enters the multi-mode mixing region of the Rotman lens 1505. Output waveguides 1517 can also be spaced a similar or same distance apart as the input waveguides. Similar to MMIs, waveguides, tapers, and mixing regions can be made of a core guiding material with a refractive index $n_{core} > n_{cladding}$. In the example shown in FIG. 15C, an incoming phase front 1520 arrives at the light collection apertures of the Rotman lens and the light is focused on a particular output 1521, which ensures path matching for signals collected by all apertures.

Figure 16A:
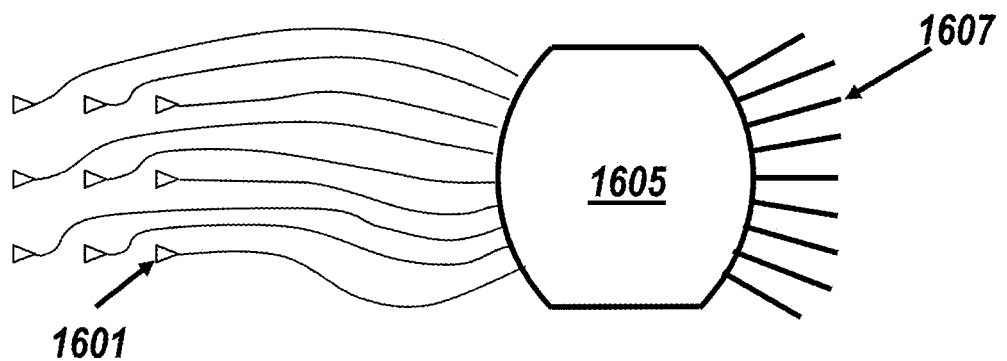
FIGS. 16A-16C show schematics of a single Rotman lens used for a 2D aperture array, according to embodiments of the present disclosure.
Figure 16B:
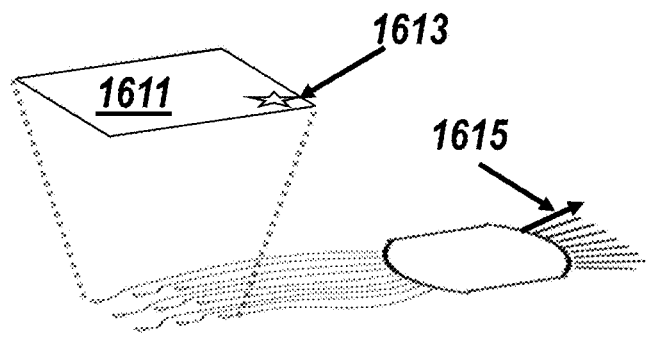
Figure 16C:
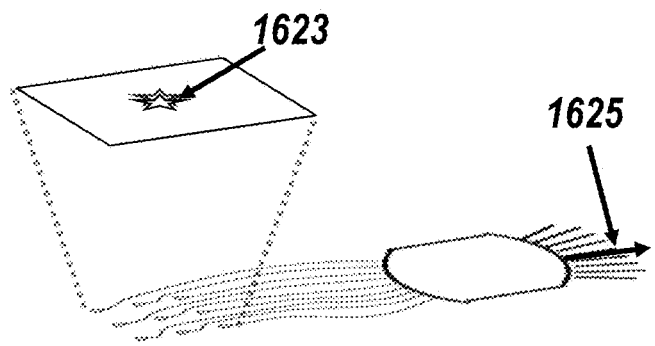

FIGS. 16A-16C show schematics of a single Rotman lens used for a 2D aperture array, according to embodiments of the present disclosure. In this example embodiment, a 3×3 2D array of apertures 1601 are directed to a single Rotman lens 1605, as shown in FIG. 16A. Each output 1607 to the detectors corresponds to the position of a source in the field of view 1611 shown in FIGS. 16B-16C. Thus, a first light source at location 1613 within the field of view 1611 will result in a signal output 1615 to a particular detector. This is a different response from the signal output 1625 caused when a second light source at location 1623 is detected. In this way, a single Rotman lens can be used to determine source location in two dimensions.

Figure 17:
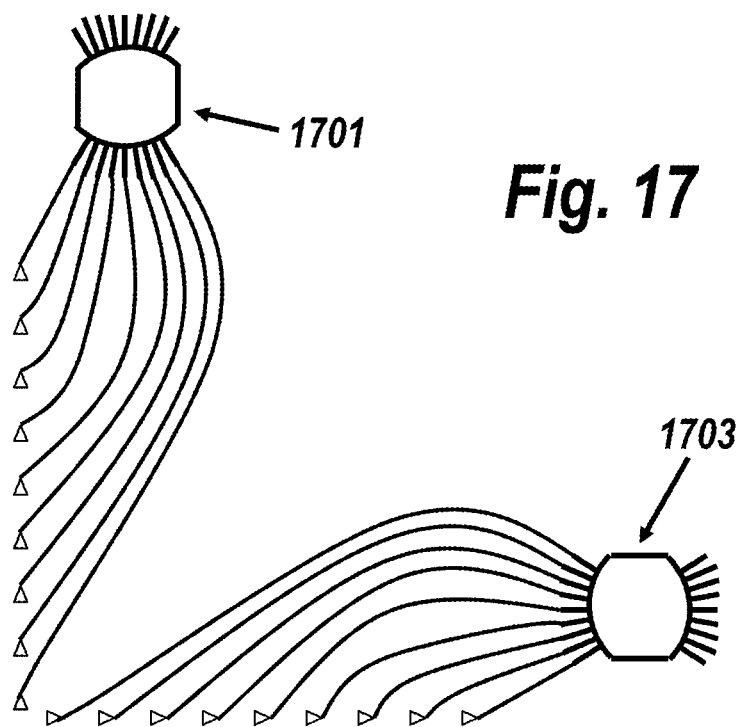
FIG. 17 shows a schematic of a multi-Rotman lens system, according to an embodiment of the present disclosure.

FIG. 17 shows a schematic of a multi-Rotman lens system, according to an embodiment of the present disclosure. In this example embodiment, a first Rotman lens 1701 is connected to apertures arranged in one dimension for determining position of a source along the y-axis in a scene, while a second Rotman lens 1703 is connected to apertures arranged in one dimension for determining position of a source along the x-axis in a scene.

Figure 18:
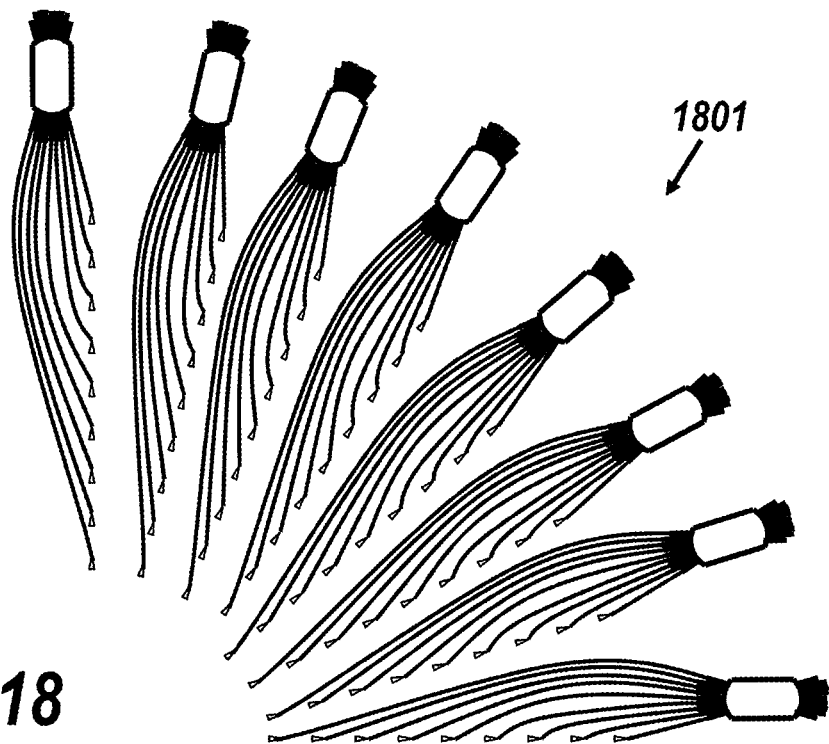
FIG. 18 shows a schematic of another multi-Rotman lens system, according to an embodiment of the present disclosure.

FIG. 18 shows a schematic of another multi-Rotman lens system, according to an embodiment of the present disclosure. In this example embodiment, more than two arrays of apertures can be tiled in order to improve fill factor for light collection and provide more information to recover more complex scenes. This example shows a set of eight Rotman lenses 1801 connected to eight arrays of apertures. One skilled in the art will appreciate that more or less arrays of apertures, or configurations of arrays, can be implemented.

Figure 19:
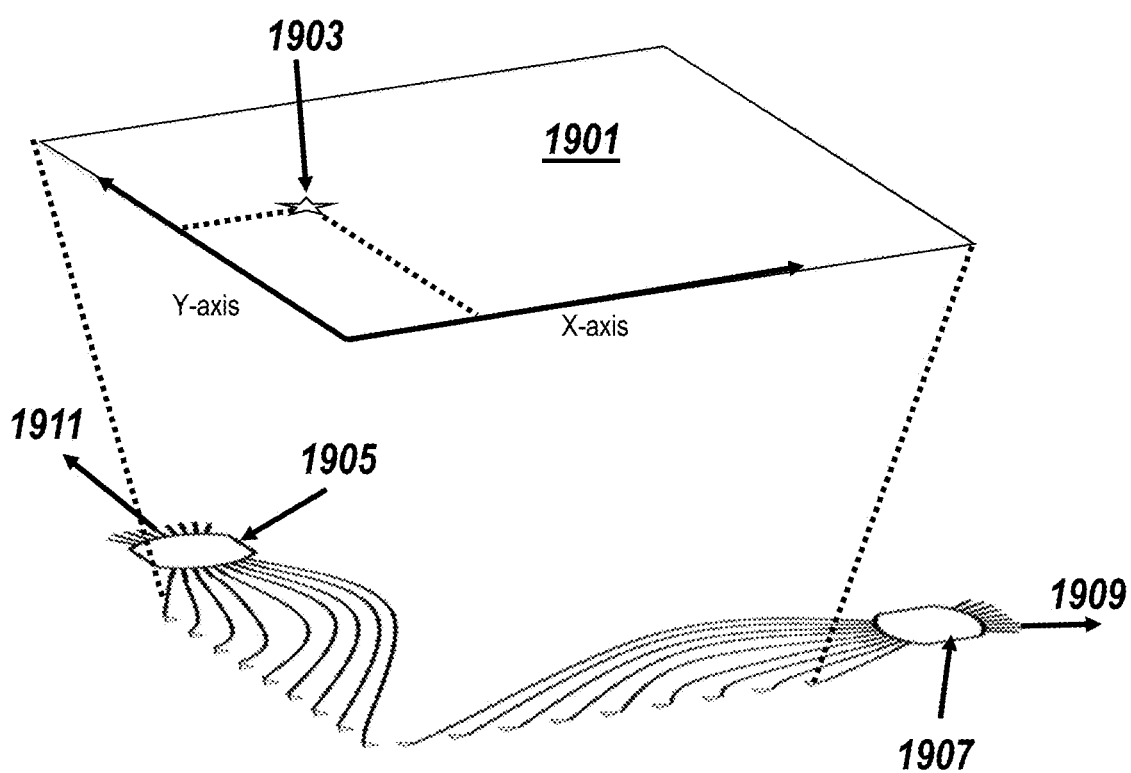
FIG. 19 shows a schematic of another multi-Rotman lens system used for determining light source location, according to an embodiment of the present disclosure.

FIG. 19 shows a schematic of another multi-Rotman lens system used for determining light source location, according to an embodiment of the present disclosure. In this example embodiment, two 1D arrays of apertures feed into a first Rotman lens 1905 and a second Rotman lens 1907. A light source detected at location 1903 within the field of view 1901 will be detected at the first Rotman lens 1905 indicating its location in the y-axis, and at the second Rotman lens 1907 indicating its location in the x-axis. This will lead to an output response 1911 indicating the light source's location in the y-axis, and an output response 1909 from the second Rotman lens 1907 indicating the light source's location in the x-axis.

Similar to the example discussed above in reference to FIG. 2, the Rotman lens can also be implemented in a staged system where several Rotman lenses are used as mixers at numerous stages. In one example embodiment, given a 2D array of grating collectors, each column can feed into a separate Rotman lens, the outputs of which all feed into a single large Rotman lens. The outputs of this structure then feed into detectors. One skilled in the art will appreciate that such a system can have as few or as many stages of Rotman lenses as required by a given embodiment. As will be appreciated, the FIGS. are not necessarily drawn to scale, and the path matching of waveguides is not shown in all the examples shown in FIGS. The Rotman lens can also be implemented in a layered embodiment, as discussed in reference to FIG. 7 above, wherein the waveguides and mixing regions (i.e. the Rotman lenses) can be stacked in a number of layers.

Rotman lenses fall under a class of devices comprised of an array of input waveguide ports, a mixing region, and an array of output waveguide ports, where the input ports, output ports, or both are arranged in a curved geometry. Similar devices include the "Rotman Lens", "Bootlace Lens", and "Parabolic Bootlace Lens". For simplicity, throughout this disclosure the term "Rotman lens" is used to describe all devices under this class, including Bootlace lenses, Parabolic Bootlace lenses, etc. The concepts for their use in integrated photonic imaging devices apply to all types of these devices. These devices are characterized in more detail in the publication: Kushwah, R. P. S., & Singhal, P. K. (2011). Comparative Analysis of Parabolic Bootlace Lens and Conventional Lens Approach. Journal of Electromagnetic Analysis and Applications, 3(2), 65-68. https://doi.org/10.4236/jemaa.2011.32011

Figure 20A:
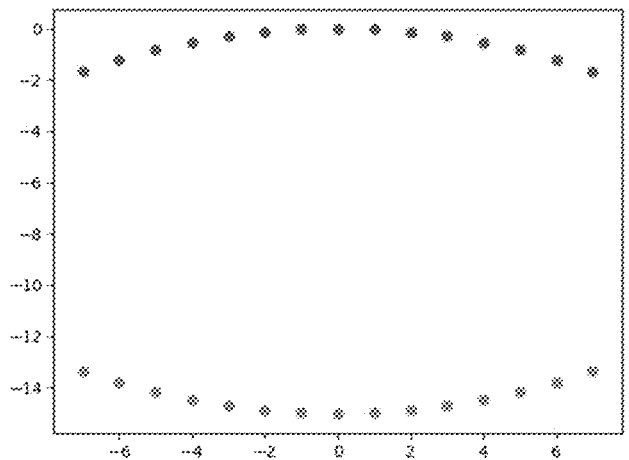
FIGS. 20A-20B show two schematics of input and output spacing for example Rotman lenses, according to an embodiment of the present disclosure.
Figure 20B:
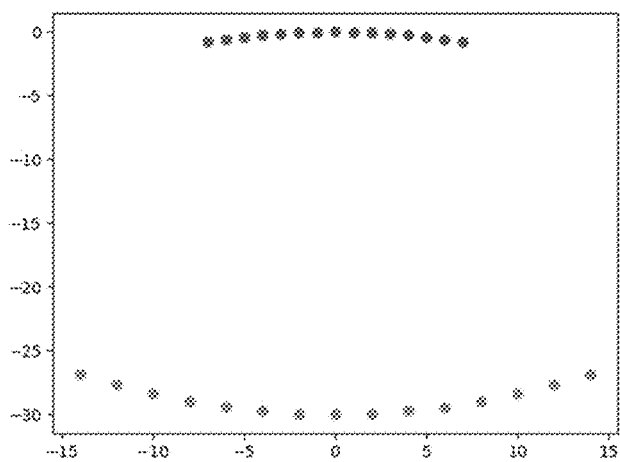

FIGS. 20A-20B show two schematics of input and output spacing for example Rotman lenses, according to an embodiment of the present disclosure. In one example embodiment, the device has input/output separations of 1 wavelength. A non-limiting example of such a device with 15 inputs/outputs is pictured in FIG. 20A. The length and width of the device will be equal and have value "num_outputs*separation". A device with fewer inputs (antennas) than outputs (detectors) is effectively the same as a device with the same number of inputs and outputs, but with the unused input ports deleted. For example, a 5 input, 7 output device is just a 7 input, 7 output device with, for example, the left and right-most input ports deleted. The device width is trivially derived from the separation times the number of ports. The length is equal to the width because going any smaller produces phase errors that get larger quickly, and going larger is wasteful. The circles defining the input and output curves have radius equal to the length, as otherwise they wouldn't focus onto the center of the opposite side. The corresponding parabola (which approximates the circle) is defined by $y=x^2/(2*height)$. Note that the curves in this example are equal in curvature.

Increasing the separations results in a device that is wider but also longer. Doubling only one of the separations doubles the length, as shown in the example of FIG. 20B. This means doubling both (i.e. "scaling up" the device) would quadruple the length (doubled_input_and_output_spacing.png). This generalizes, so tripling the width multiplies the length by 9.

Figure 21A:
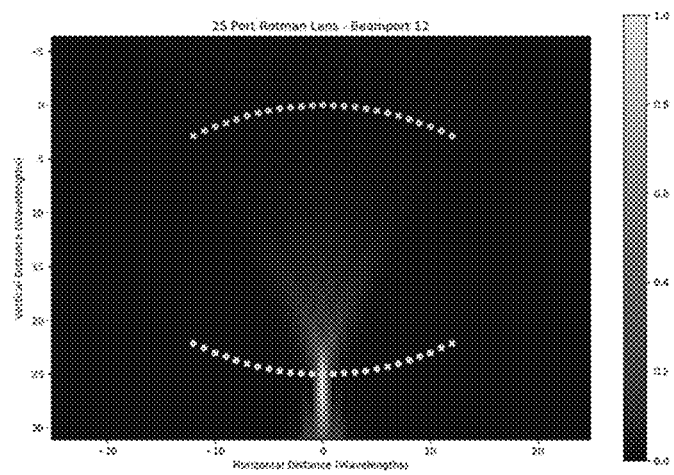
FIGS. 21A-21B show intensity patters for two Rotman lens devices, according to embodiments of the present disclosure.
Figure 21B:
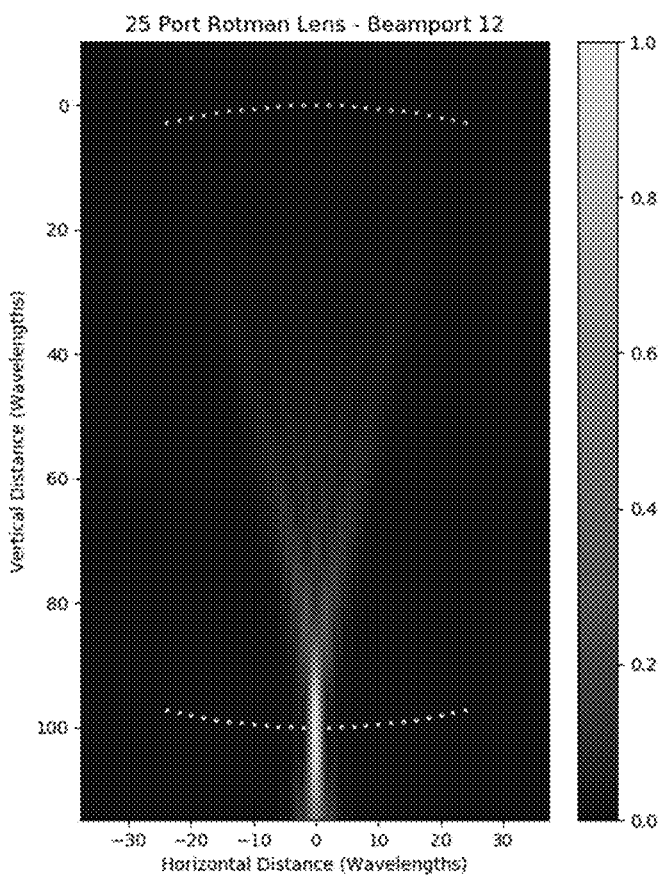
Figure 1:
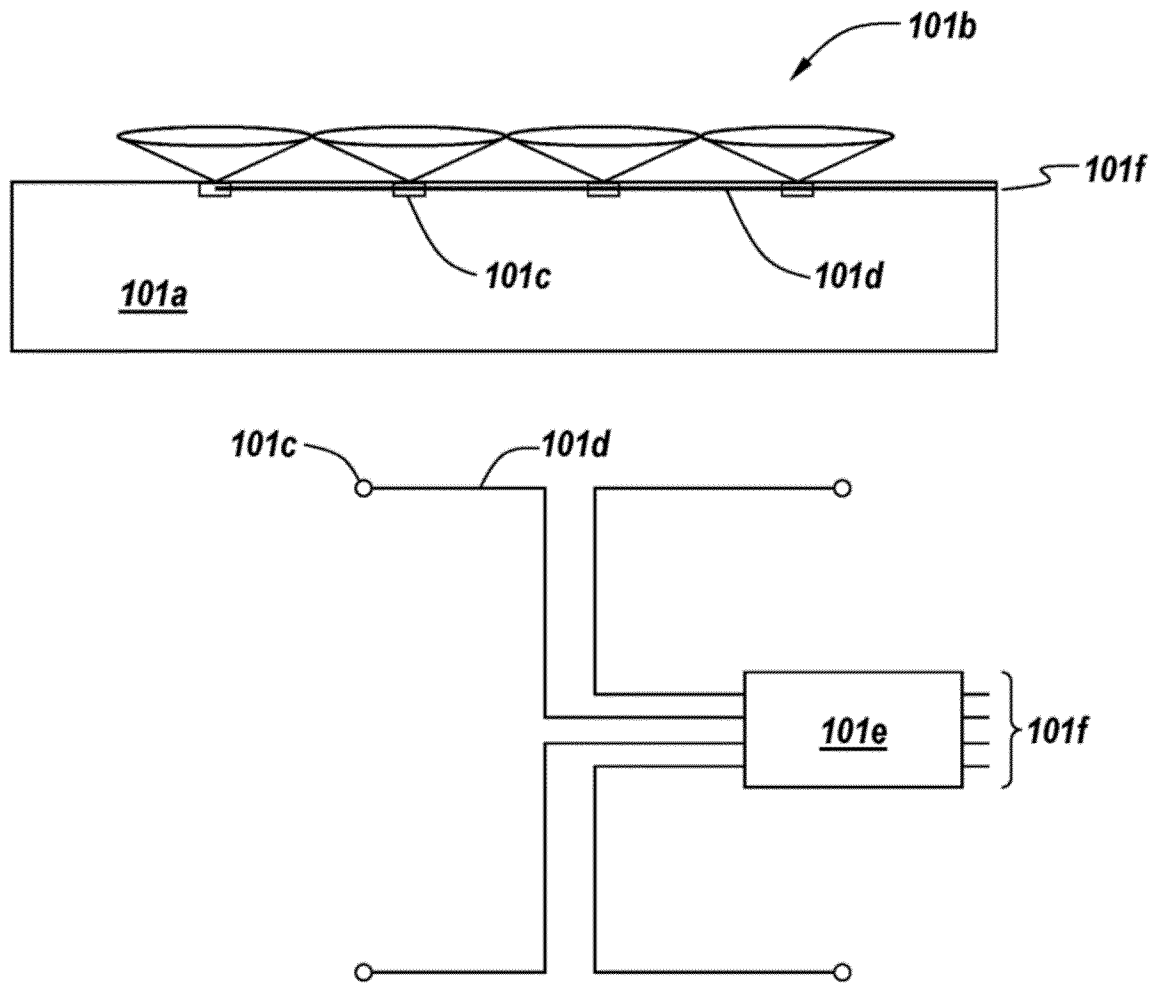
Figure 2:
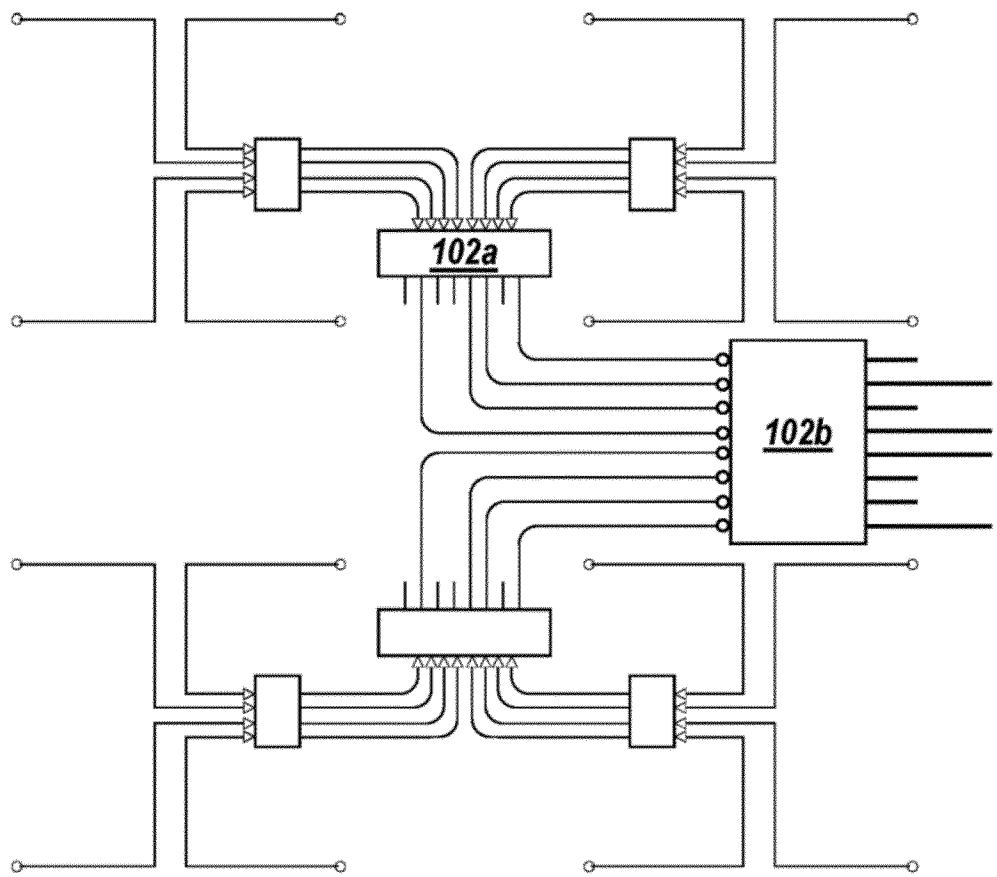
Figure 3:
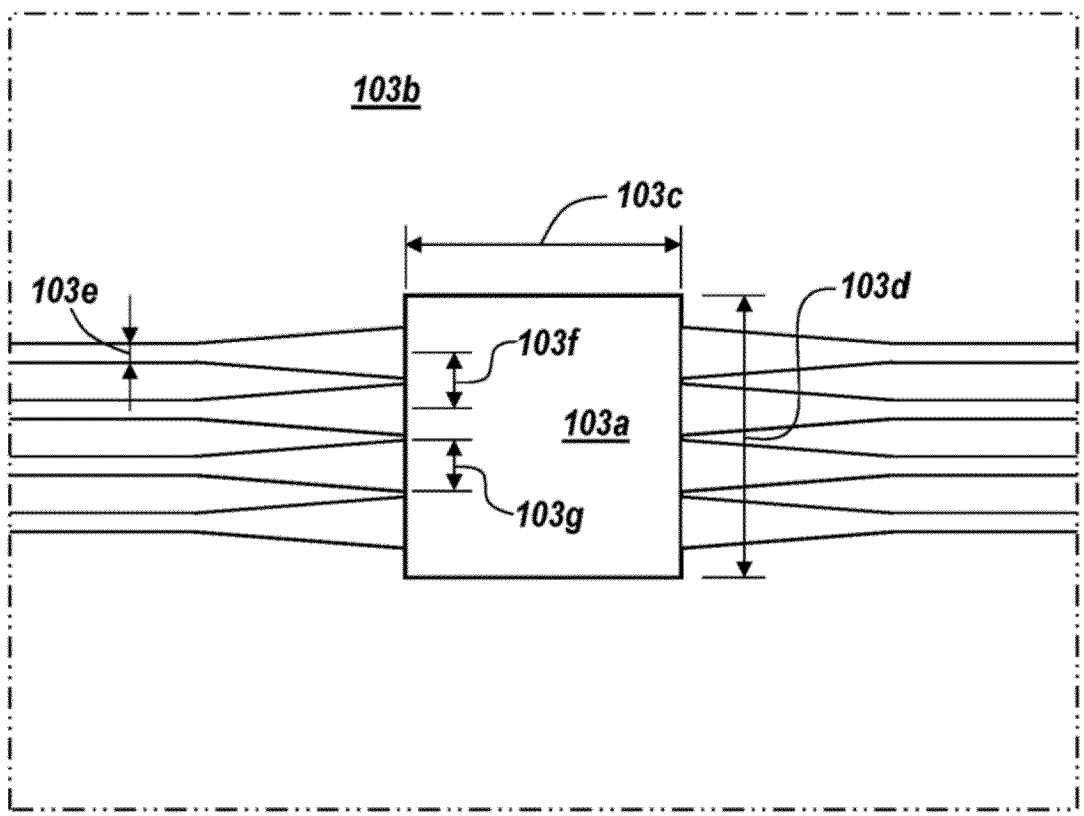
Figure 4:
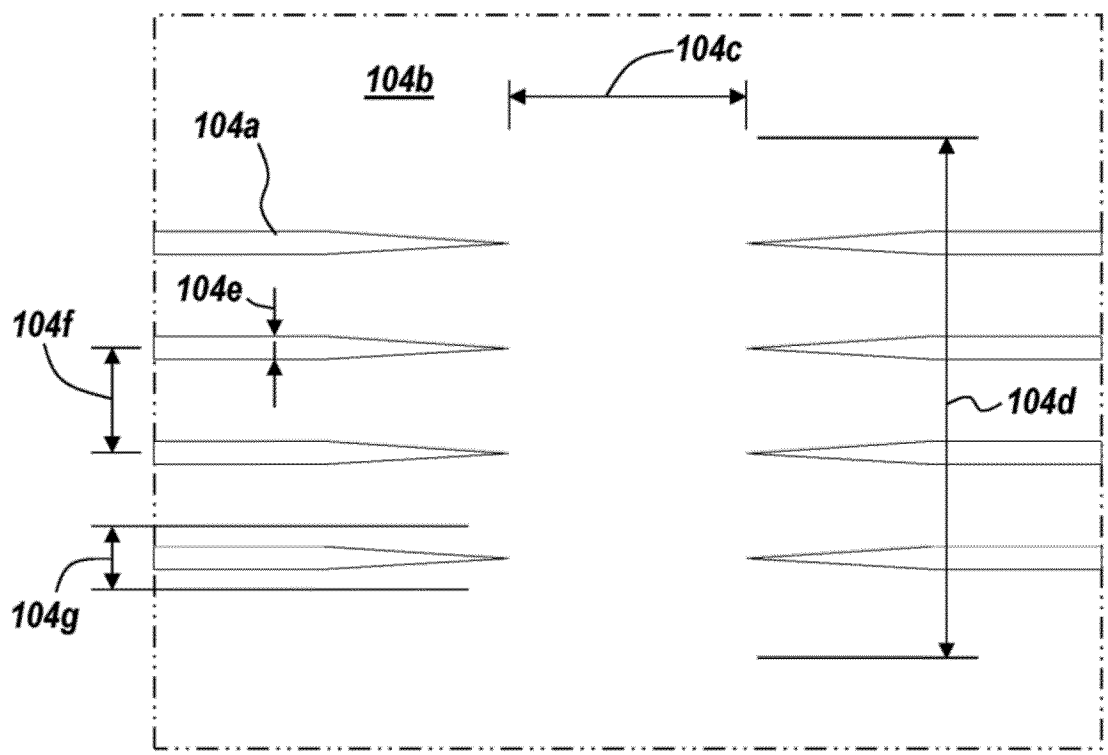
Figure 5A:
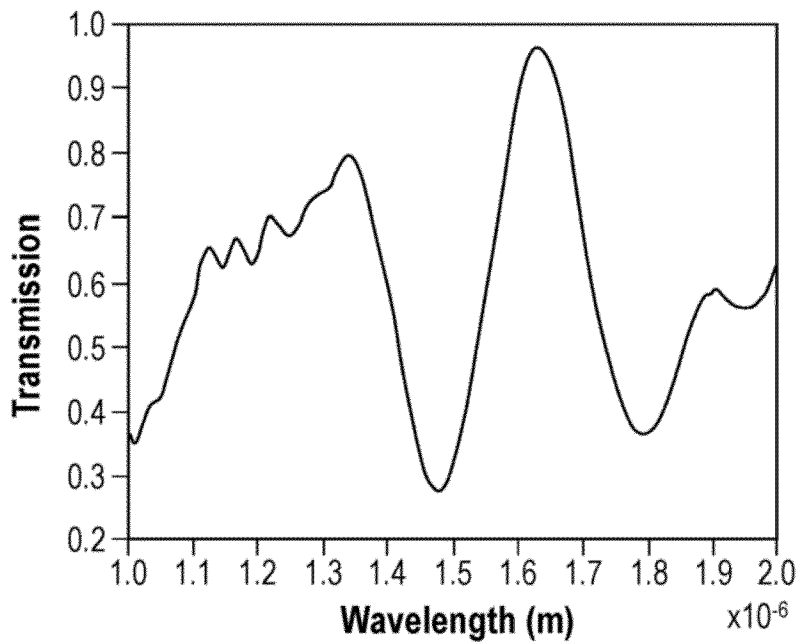
Figure 5B:
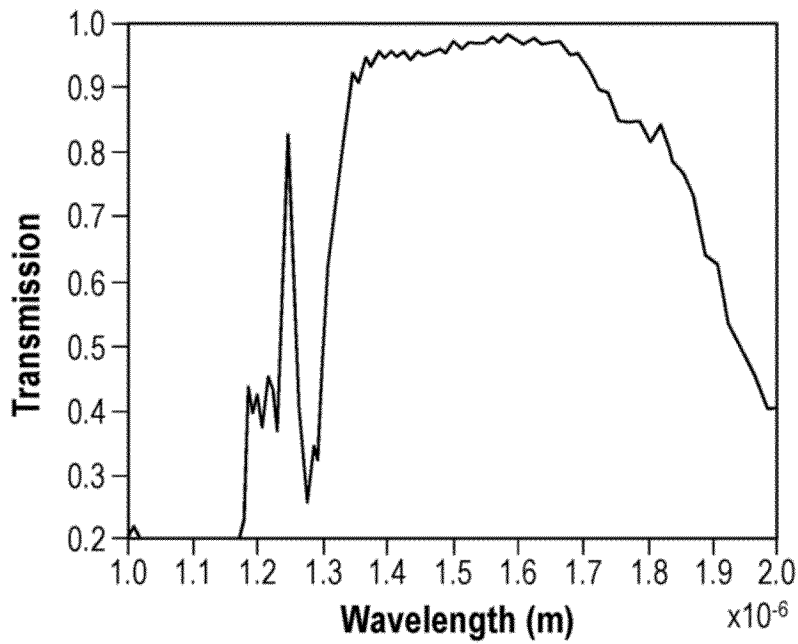
Figure 6:
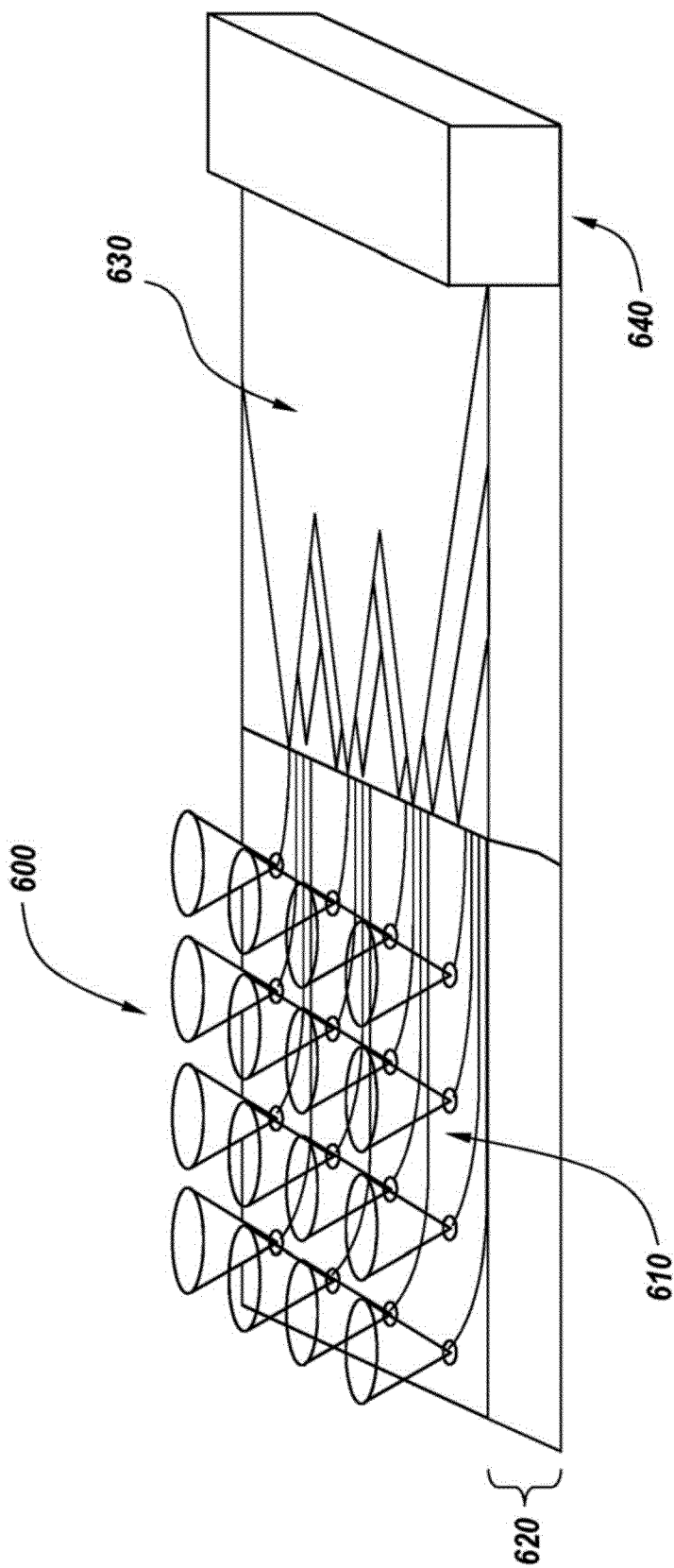
Figure 7:
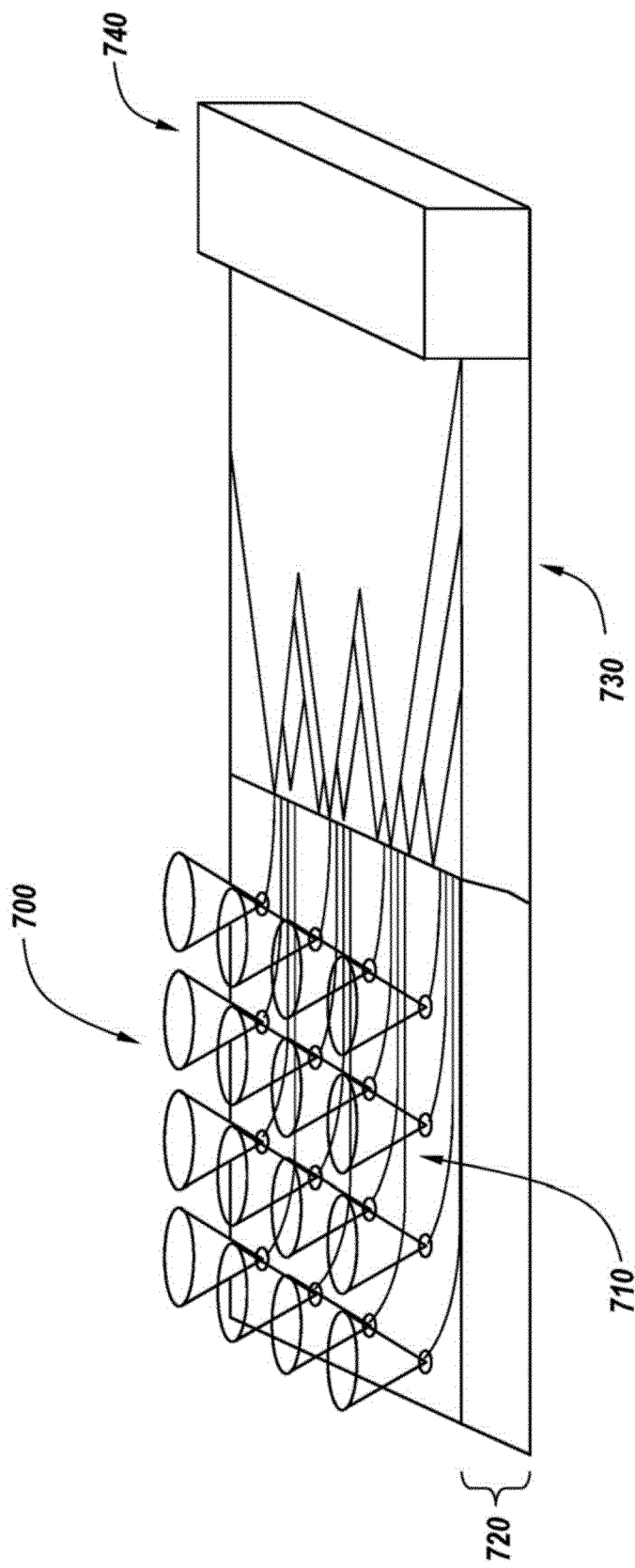
Figure 8A:
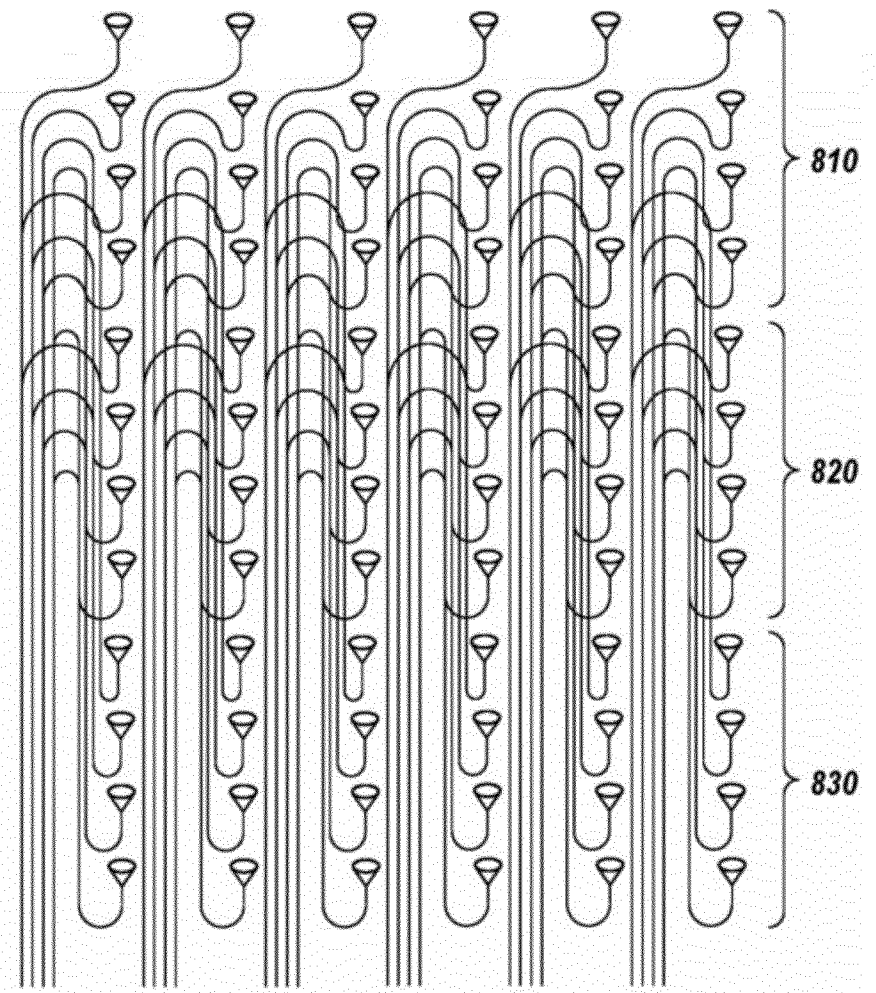
Figure 8B:
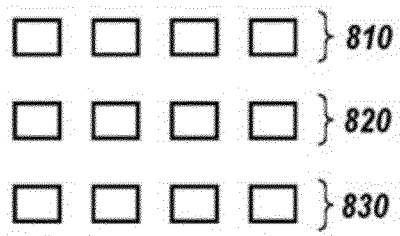
Figure 10:
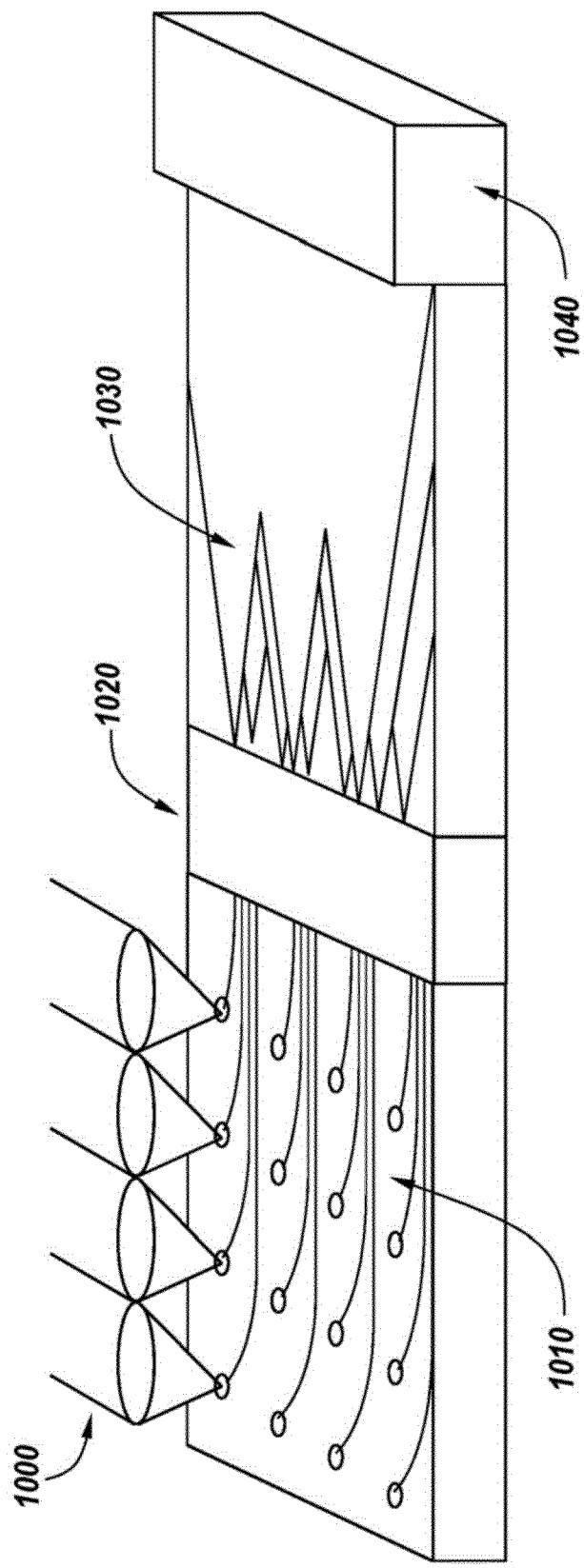

FIGS. 21A-21B show intensity patters for two Rotman lens devices, according to embodiments of the present disclosure. Increasing input/output separations (and consequently device width and length) causes the device to become less round and more square, as the parabolas/circles on either side flatten out to increase their focal distance to reach the opposite side. The flattening produces two interesting effects: one is reduced phase error, the other is that one side may be flattened without introducing significant phase error as it's basically already flat. The second effect is visible in the intensity pattern of the devices in FIGS. 21A-21B. The smaller device shown in FIG. 21A has spacing/separation of 1 wavelengths, while the larger one shown in FIG. 21B uses 2 wavelengths. The ratio of the depth of focus of the beam (brighter region where signal is focused, near the horizontal distance value 0) to the height of the parabola is clearly worse in the device of FIG. 21A. In other words, the focused portion of the beam (as it scans across the FOV) would intersect every part of the larger device's flattened output shown in FIG. 21B, but not the smaller device's flattened output shown in FIG. 21A. The result is that flattening the smaller device's outputs introduces blur to some off-axis beam positions, as they're significantly out of focus. This is analogous to the short depth of focus of a short focal length (low F/# or high numerical aperture) lens versus a longer depth of focus of a long focal length (high F/# or low numerical aperture) lens.

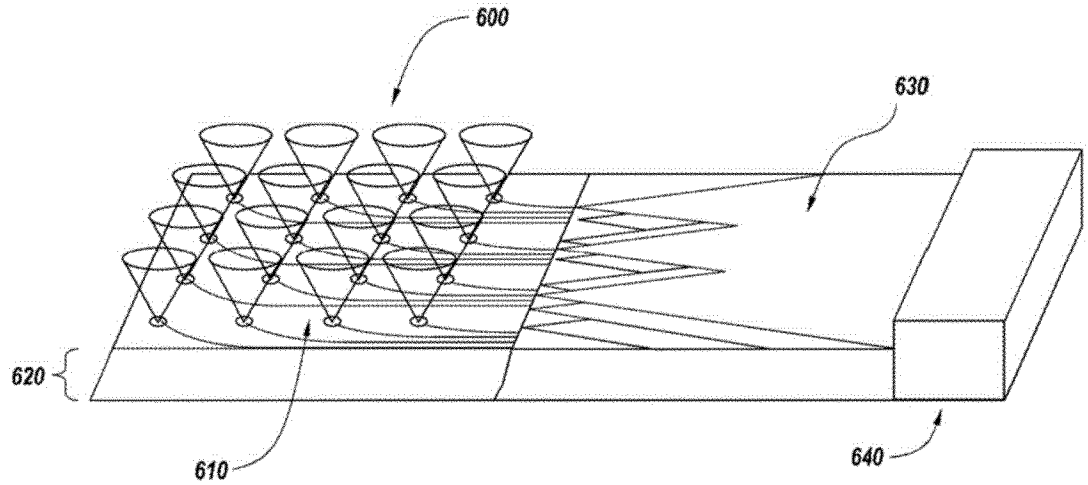

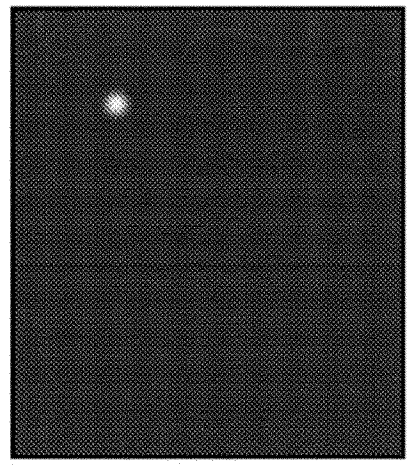
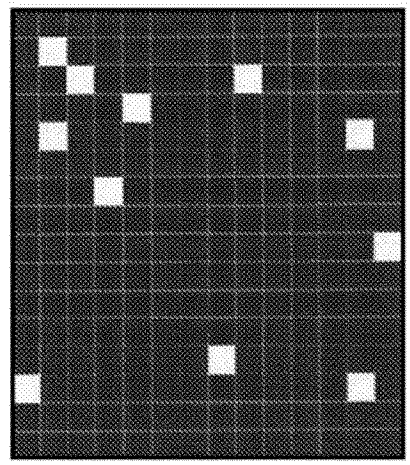
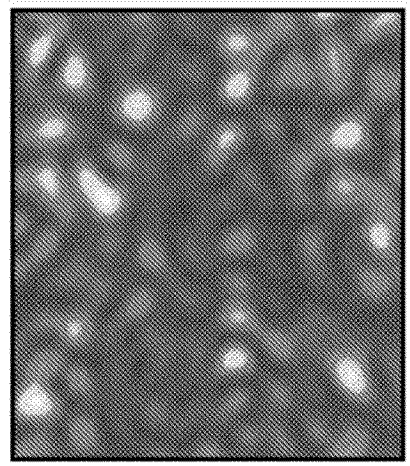

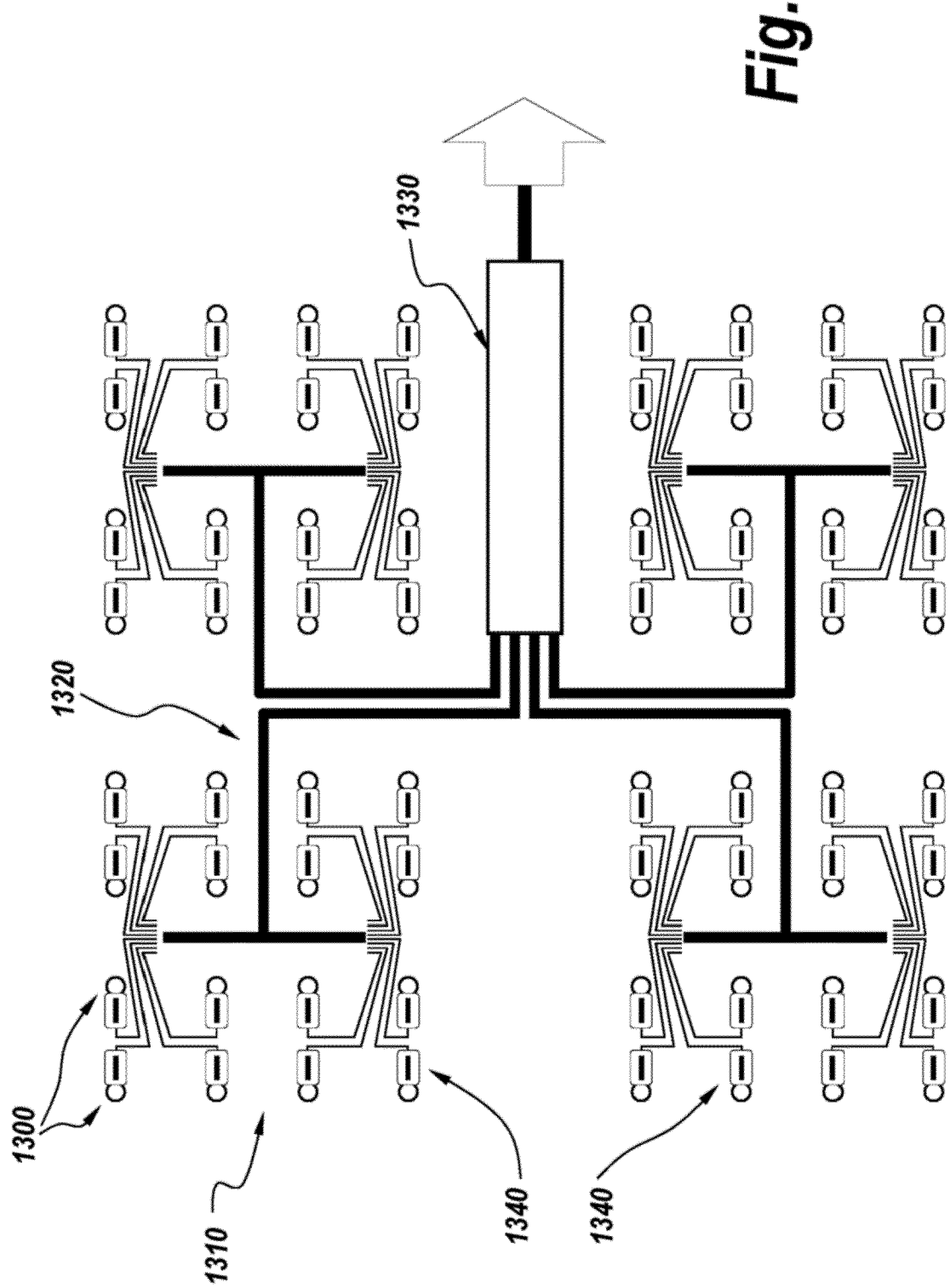

What is claimed is:

1. A method of extracting an image from a transform imager, the method comprising:
   receiving light at a first plurality of input ports of a transform imager,
   directing the light to a waveguide mixing region via a waveguide array;
   mixing the light within the waveguide mixing region to produce mixed light;
   receiving the mixed light at a plurality of detectors from the waveguide mixing region;
   measuring responses from the plurality of detectors to the received mixed light in order to perform calibration;
   selecting measured responses corresponding to peaks in the received mixed light;
   adjusting the calibration in order to recover different targeted information; and
   wherein the transform imager is a compressive transform imager wherein some outputs from the waveguide mixing region are terminated, such that the first plurality of input ports has a number of input ports greater than a number of detectors in the plurality of detectors.

2. The method of claim 1, further comprising reconfiguring an output response of the transform imager by: introducing a phase shift between $-\pi$ to or $\pi$ between 0 and $2\pi$ at input apertures; and recovering additional information to recover a scene using a unique set of output responses from the imager.

3. The method of claim 1, wherein said step of measuring responses from the plurality of detectors to the received mixed light in order to perform calibration comprises using the measured responses of the plurality of detectors to generate a complex matrix representing a modification of phase or amplitude of a transfer matrix of the transform imager; determining a set of unique outputs from the transform imager; recovering the transfer matrix of the transform imager with no modifications of phase or amplitude introduced thereto; combining the transfer matrix and the complex matrix representing the modification of phase or amplitude; and recovering additional information from the imager by using N times more unique modifications of phase or amplitude at inputs to account for an N times reduction in total number of output ports.

4. The method of claim 1, wherein the step of selecting measured responses includes identifying at least the top 5% of intensity values of the measured responses.

5. The method of claim 1, further comprising utilizing a micro-lens array for collecting the light.

6. The method of claim 1, wherein any of the waveguide array and the waveguide mixing region is formed of a material selected from the group consisting of a silicon, silicon nitride, sapphire, titanium oxide, diamond, silicon carbide, chalcogenide glass and plasmonic structures.

7. The method of claim 1, wherein each of said plurality of input ports comprises any of an aperture and a grating coupler.

8. The method of claim 1, wherein the terminated outputs of the waveguide mixing region are randomly or irregularly spaced.

9. A transform imager, comprising:
a first plurality of input ports configured to receive light,
a waveguide array configured to direct the received light to a waveguide mixing region for mixing the light to produce mixed light at a plurality of outputs thereof,
a plurality of detectors configured to receive the mixed light and generate responses based on the detection of the received light,
wherein some of the outputs of the waveguide mixing region are terminated such that a number of the plurality of the input ports is greater than a number of the plurality of the detectors;
wherein the transform imager is configured to:
measure the responses from the plurality of the detectors,
select measured responses corresponding to peaks in the mixed light, and
adjust a calibration to recover different targeted information.

* * * * *

UNITED STATES PATENT AND TRADEMARK OFFICE
CERTIFICATE OF CORRECTION

PATENT NO. : 11,641,531 B2
APPLICATION NO. : 17/113956
DATED : May 2, 2023
INVENTOR(S) : Michael Moebius et al.

It is certified that error appears in the above-identified patent and that said Letters Patent is hereby corrected as shown below:

On the Title Page

Under ABSTRACT "9 Claims, 21 Drawing Sheets" should read --9 Claims, 20 Drawing Sheets-- as shown on the attached title page.

In the Drawings

Sheets 1-21 should be deleted, to be replaced with the drawing sheets, 1-20 as shown on the attached pages.

Signed and Sealed this
Tenth Day of September, 2024

Katherine Kelly Vidal
*Director of the United States Patent and Trademark Office*

United States Patent
Moebius et al.

(12) United States Patent
(10) Patent No.: US 11,641,531 B2
(45) Date of Patent: May 2, 2023

(54) MULTI-MODE INTERFERENCE COUPLER-BASED FLAT COMPRESSIVE AND TRANSFORM IMAGER

(71) Applicant: The Charles Stark Draper Laboratory Inc., Cambridge, MA (US)

(72) Inventors: Michael Moebius, Allston, MA (US); Julian Brown, Cambridge, MA (US); Steven Spector, Lexington, MA (US); Benjamin Lane, Sherborn, MA (US); Alan Zhou, Brookline, MA (US); Hannah Anne Clevenson, Cambridge, MA (US); Lucas David Benney, Brighton, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 17/113,956

(22) Filed: Dec. 7, 2020

(65) Prior Publication Data
US 2021/0120197 A1    Apr. 22, 2021

Related U.S. Application Data

(62) Division of application No. 16/173,854, filed on Oct. 29, 2018, now Pat. No. 11,218,655.

(60) Provisional application No. 62/578,120, filed on Oct. 27, 2017.

(51) Int. Cl.
*G02B 6/293*    (2006.01)
*H04N 5/369*    (2011.01)
*G02B 27/00*    (2006.01)
*G02B 3/00*    (2006.01)
*G02B 6/42*    (2006.01)
*G02B 6/28*    (2006.01)
*G02B 5/18*    (2006.01)

(52) U.S. Cl.
CPC .......... *H04N 5/369* (2013.01); *G02B 3/0056* (2013.01); *G02B 6/29344* (2013.01); *G02B 6/4215* (2013.01); *G02B 27/0087* (2013.01); *G02B 3/0043* (2013.01); *G02B 6/2813* (2013.01); *G02B 2005/1804* (2013.01)

(58) Field of Classification Search
None
See application file for complete search history.

(56) References Cited

U.S. PATENT DOCUMENTS

| | | |
|---|---|---|
| 6,819,789 B1 | 11/2004 | Kantor et al. |
| 6,956,653 B1 | 10/2005 | Lam |
| 2003/0223672 A1 | 12/2003 | Joyner et al. |

(Continued)

FOREIGN PATENT DOCUMENTS

WO    WO-2010023283 A1 *    3/2010    ............ G02B 6/125

OTHER PUBLICATIONS

International Search Report and Written Opinion dated Mar. 8, 2019 in PCT Application No. PCT/IB2018/058459.

*Primary Examiner* — Chad H Smith
(74) *Attorney, Agent, or Firm* — Potomac Law Group, PLLC; Reza Mollaaghababa; John J. Penny, Jr.

(57) ABSTRACT

A compressive/transform imager comprising a lens array positioned above input ports for collecting light into the input ports, waveguides routing the light from the input port to waveguide mixing regions (e.g. multi-mode interference couplers), and detectors for receiving outputs of the waveguide mixing regions.

9 Claims, 20 Drawing Sheets